(12) United States Patent
Gilbert et al.

(10) Patent No.: US 10,556,808 B2
(45) Date of Patent: Feb. 11, 2020

(54) PITCHERS, FILTRATION UNITS, AND FILTRATION SYSTEMS AND METHODS

(71) Applicant: Aquasana, Inc., Austin, TX (US)

(72) Inventors: Duane Gilbert, Cambridge, MA (US); David Rinaldis, Redwood City, CA (US); Henry Sim, Palo Alto, CA (US); Arthur Kwun, Newark, CA (US); Martin Leugers, San Francisco, CA (US); Josh Druker, Redwood City, CA (US); Stephen Senatore, South San Francisco, CA (US); Kevin Simmons, Palo Alto, CA (US); Wes Russell, Austin, TX (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 0 days.

(21) Appl. No.: 16/138,731

(22) Filed: Sep. 21, 2018

(65) Prior Publication Data
US 2019/0256371 A1    Aug. 22, 2019

Related U.S. Application Data

(63) Continuation of application No. 13/987,320, filed on Mar. 1, 2013, now abandoned, which is a continuation-in-part of application No. 13/987,291, filed on May 13, 2012, now abandoned.

(51) Int. Cl.
| | |
|---|---|
| *C02F 1/00* | (2006.01) |
| *B01D 35/143* | (2006.01) |
| *B01D 35/02* | (2006.01) |

(52) U.S. Cl.
CPC .............. *C02F 1/003* (2013.01); *B01D 35/02* (2013.01); *B01D 35/143* (2013.01); *C02F 2209/445* (2013.01); *C02F 2307/04* (2013.01)

(58) Field of Classification Search
CPC ............... C02F 1/003; C02F 2209/445; C02F 2307/04; B01D 35/02; B01D 35/143
See application file for complete search history.

(56) References Cited

U.S. PATENT DOCUMENTS

| | | |
|---|---|---|
| 3,692,180 A | 9/1972 | LaRaus |
| 3,950,253 A | 4/1976 | Stern |
| 4,528,095 A | 7/1985 | Byrne |
| D283,004 S | 3/1986 | Jack |
| 4,683,054 A | 7/1987 | Turnbull |
| 5,039,402 A | 8/1991 | Himelstein |

(Continued)

FOREIGN PATENT DOCUMENTS

| | | |
|---|---|---|
| CN | 102249468 A | 11/2011 |
| CN | 102348645 A | 2/2012 |

(Continued)

OTHER PUBLICATIONS

International Search Report and Written Opinion issued in International Application No. PCT/US2013/040803 dated Sep. 26, 2013.

(Continued)

*Primary Examiner* — Nicholas J. Weiss
(74) *Attorney, Agent, or Firm* — Michael Best & Friedrich LLP

(57) ABSTRACT

The present invention relates generally to fluid filtration, such as, for example, filtration systems and methods, filtration units, pitchers, and combinations thereof.

3 Claims, 23 Drawing Sheets

(56) References Cited

U.S. PATENT DOCUMENTS

| | | | |
|---|---|---|---|
| 5,049,270 A | 9/1991 | Carrano et al. |
| 5,087,883 A | 2/1992 | Hoffman |
| 5,106,495 A | 4/1992 | Hughes |
| 5,223,132 A | 6/1993 | Yoon |
| D341,871 S | 11/1993 | Bannigan |
| 5,296,148 A | 3/1994 | Colangelo et al. |
| 5,643,444 A | 7/1997 | Garrigues et al. |
| 5,900,143 A | 5/1999 | Dalton et al. |
| 5,964,143 A | 10/1999 | Driscoll et al. |
| 6,024,867 A | 2/2000 | Parise |
| 6,099,735 A | 8/2000 | Kelada |
| 6,178,290 B1 | 1/2001 | Weyrauch et al. |
| 6,210,032 B1 | 4/2001 | Murphy |
| 6,295,831 B1 | 10/2001 | Watson |
| 6,361,686 B1 | 3/2002 | Conrad |
| 6,379,560 B1 | 4/2002 | Tilp et al. |
| 6,491,815 B2 | 12/2002 | Conrad et al. |
| 6,527,950 B2 | 3/2003 | Conrad et al. |
| 6,872,306 B2 | 3/2005 | Shen |
| 6,953,523 B2 | 10/2005 | Vandenbelt et al. |
| 7,101,480 B2 | 9/2006 | Carlotto |
| 7,413,653 B2 | 8/2008 | Powell |
| 7,476,312 B2 | 1/2009 | Laing et al. |
| 7,513,278 B2 | 4/2009 | Hengsperger et al. |
| 7,601,256 B2 | 10/2009 | Beall |
| 7,615,152 B2 | 11/2009 | Tanner et al. |
| 7,641,076 B2 | 1/2010 | Nishida |
| 8,097,159 B1 | 1/2012 | Peng |
| 8,480,882 B2 | 7/2013 | Cueman et al. |
| 8,747,664 B2 | 6/2014 | Dier |
| 2006/0162806 A1 | 7/2006 | Hengsperger et al. |
| 2006/0163174 A1 | 7/2006 | Namespetra et al. |
| 2007/0209984 A1 | 9/2007 | Lev et al. |
| 2007/0278141 A1 | 12/2007 | Patera et al. |
| 2008/0087596 A1 | 4/2008 | Bommi et al. |
| 2009/0236276 A1 | 9/2009 | Kurth et al. |
| 2010/0044291 A1 | 2/2010 | Tseng |
| 2011/0210068 A1 | 9/2011 | Lalor et al. |
| 2011/0268845 A1 | 11/2011 | Fantappie |
| 2014/0124429 A1 | 5/2014 | Rinaldis et al. |
| 2014/0332478 A1 | 11/2014 | Gilbert, Jr. et al. |

FOREIGN PATENT DOCUMENTS

| | | |
|---|---|---|
| EP | 897686 A1 | 2/1999 |
| GB | 1494744 A | 12/1977 |
| JP | 2010-247129 A | 11/2010 |
| WO | 1998/51628 A1 | 11/1998 |
| WO | 2002/28782 A1 | 4/2002 |
| WO | 2011/139614 A2 | 11/2011 |
| WO | 2013/163436 A2 | 10/2013 |
| WO | 2013/173242 A1 | 11/2013 |

OTHER PUBLICATIONS

International Search Report and Written Opinion issued in International Application No. PCT/US2015/020507 dated Jun. 10, 2015.
First Office Action from the State Intellectual Property Office of China for Application No. 2013800360759 dated Oct. 28, 2015 (14 pages).
Second Office Action from the State Intellectual Property Office of China for Application No. 2013800360759 dated Aug. 22, 2016 (15 pages).
Office Action from the US Patent and Trademark Office for U.S. Appl. No. 13/987,291 dated Aug. 29, 2016 (14 pages).
Canadian Patent Office Action for Application No. 2873407 dated Jul. 9, 2019 (4 pages).

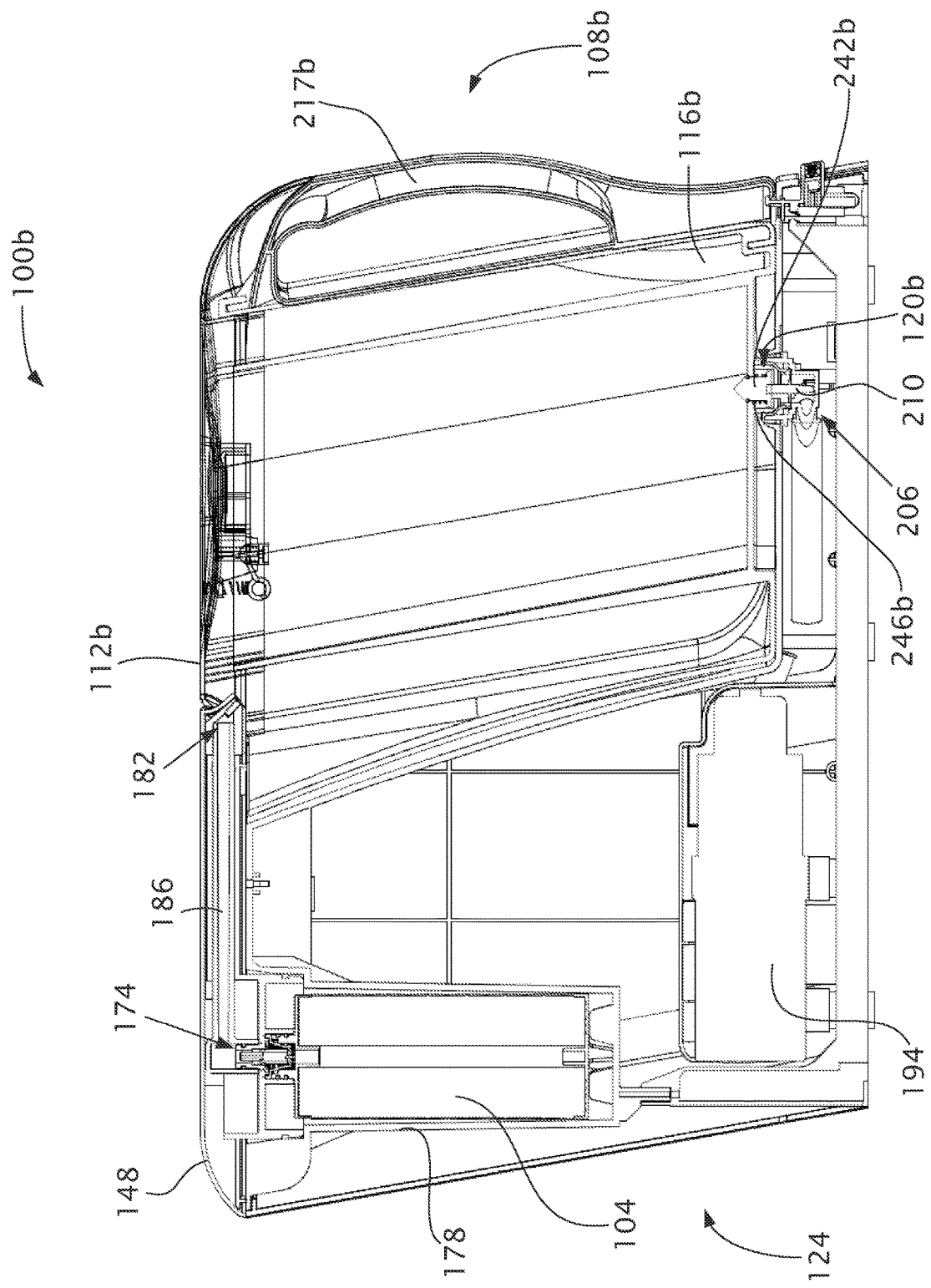

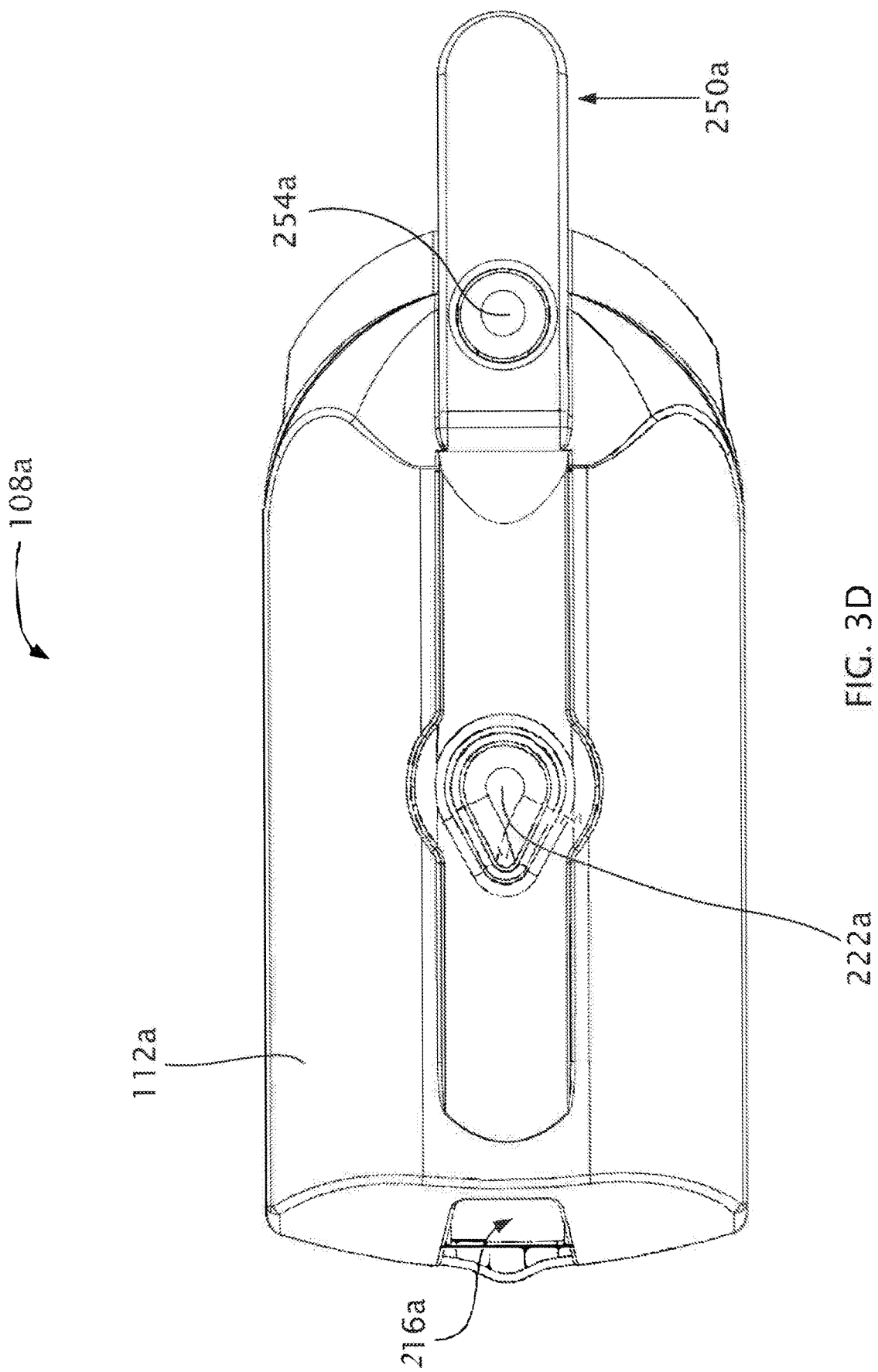

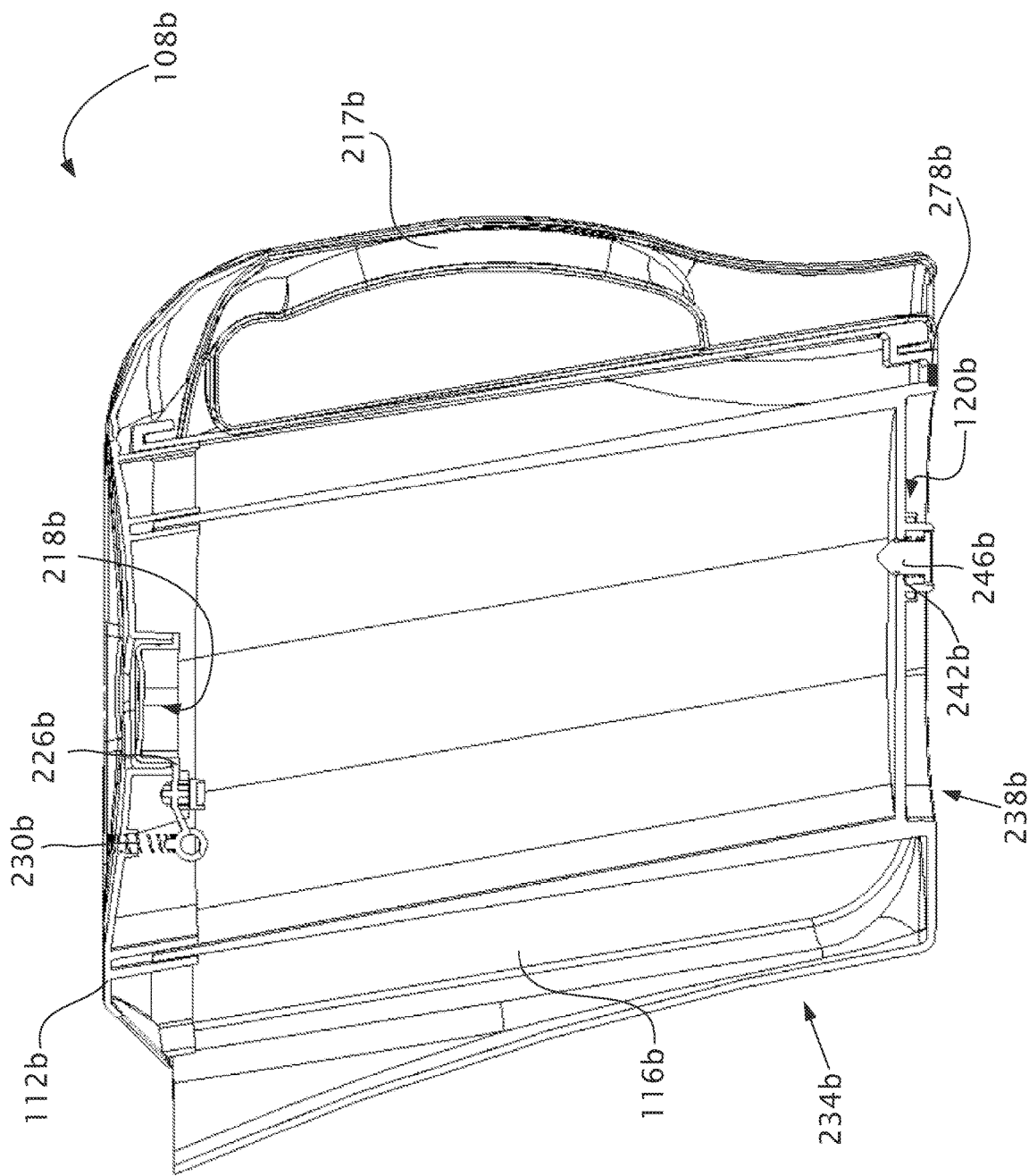

PITCHERS, FILTRATION UNITS, AND FILTRATION SYSTEMS AND METHODS

CROSS-REFERENCE TO RELATED APPLICATIONS

This application is a continuation of U.S. patent application Ser. No. 13/987,320, filed Mar. 1, 2013, which is a continuation-in-part of U.S. patent application Ser. No. 13/987,291, filed May 13, 2013.

BACKGROUND

The present invention relates to fluid filtration, and more particularly, but not by way of limitation, to filtration systems and methods, filtration units, pitchers, and components thereof Examples of filtration systems are disclosed in U.S. Pat. Nos. 5,296,148; 5,643,444; and 6,361,686 and in U.S. Patent Publication Nos. 2006/0163174 and 2007/0209984.

SUMMARY

This disclosure includes embodiments of filtration systems and methods, filtration units, pitchers, and components thereof.

Some embodiments of the present pitchers comprise a lid; a base comprising a sidewall and a bottom, the base configured to be coupled to the lid such that the base and the lid cooperate to define a container configured to hold fluid, where the base has a valve configured to be in: an open configuration when the pitcher is coupled to a filtration unit and a closed configuration when the pitcher is not coupled to a filtration unit; and a divider configured to divide the container into a first compartment and a second compartment, the divider oriented such that the first compartment and the second compartment each comprises at least a portion of the bottom of the base. Some embodiments of the present pitchers comprise a base having a valve configured to be in: an open configuration when the pitcher is coupled to a filtration unit and a closed configuration when the pitcher is not coupled to a filtration unit; and a lid configured to be coupled to the base such that the base and the lid cooperate to define a container configured to hold fluid, where the lid comprises a dispenser configured such that if the pitcher is coupled to a filtration unit and the dispenser is activated, fluid is permitted to exit the pitcher through the valve and is permitted to re-enter the pitcher through the lid.

Some embodiments of the present filtration units comprise a housing configured to be coupled to a pitcher having a valve, the housing configured to cooperate with the pitcher to open the valve; and a pump coupled to the housing and configured to be in fluid communication with a filter if a filter is coupled to the housing, where the filtration unit is configured such that if a pitcher having a valve and holding fluid is coupled to the housing and if a filter is coupled to the housing, the pump will pump fluid from the pitcher through the valve and the filter and into the pitcher.

Some embodiments of the present filtration systems comprise a pitcher comprising: a lid; and a base configured to be coupled to the lid such that the base and the lid cooperate to define a container configured to hold fluid, where the base has a valve configured to be in: an open configuration when the pitcher is coupled to a filtration unit; and a closed configuration when the pitcher is not coupled to a filtration unit; and a filtration unit configured to be coupled to the pitcher, the filtration unit comprising a housing configured to cooperate with the pitcher to open the valve; and a pump configured to be in fluid communication with a filter if a filter is coupled to the filtration system, where if the pitcher has fluid and is coupled to the filtration unit and if a filter is coupled to the filtration unit, the pump is configured to pump fluid from the pitcher through the valve and the filter and into the pitcher.

Some embodiments of the present methods comprise coupling a pitcher having a valve to a filtration unit such that the valve opens; and activating a pump to pump fluid from the pitcher through the valve, the filtration unit, and a filter, and back into the pitcher.

This disclosure includes designs for pitchers and portions of pitchers. Some of the present pitcher designs include portions that are clear, translucent, transparent, and/or opaque, such as a container portion configured to hold fluid (such as drinking water) and that may include two compartments separated by a divider. Some of the present pitcher designs do not include the bottom of the pitcher. Some of the present designs of pitcher portions include the handle (as well as any portion of the handle), the container portion (as well as any part of the container portion); the spout portion (as well as any part of the spout portion), and the lid of the container (as well as any portion of the lid, such as the top of the lid). Some of the present designs of pitcher portions do not include the bottom of any included portion. Some of the present pitcher and base designs include a portion of the base and/or the pitcher (such as a portion of the pitcher and/or the base that is visible when the pitcher and base are coupled together, and including less than all of such a visible portion), and some do not include the bottom of any base, pitcher, or included portion of either.

This disclosure includes designs for pitchers comprising dispensers and portions of dispensers. Some of the present pitcher designs include portions that are clear, translucent, transparent, and/or opaque, such as a container portion configured to hold fluid (such as drinking water). Some of the present pitcher designs do not include the bottom of the dispenser. Some of the present designs of dispenser portions include the container portion (as well as any part of the container portion), the dispenser portion (as well as any portion of the lid, such as the top of the lid), and the spout portion (as well as any part of the spout portion). Some of the present designs of dispenser portions do not include the bottom of any included portion. Some of the present dispenser and base designs include a portion of the base and/or the pitcher (such as a portion of the pitcher and/or the base that is visible when the pitcher and base are coupled together, and including less than all of such visible portion), and some do not include the bottom of any base, pitcher, dispenser, or included portion of either.

This disclosure includes designs for filtration units and portions of filtration units. Some of the present filtration units do not include the bottom of the base. Some of the present designs of filtration units include the front (including any part of the front) of the unit, which has a low profile and on which a pitcher may be placed, the rear of the filtration unit (including any part of the rear), and the top of the filtration unit (including any part of the top). Some of the present designs of filtration units do not include the bottom of any included portion.

Any embodiment of any of the present systems, apparatuses, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiments depicted in the figures.

FIGS. 2A-2B depict a perspective view of a second embodiment of the present filtration systems with a pitcher coupled to a filtration unit.

FIGS. 3A-3E depict various views of a pitcher comprising a dispenser.

FIGS. 4A-4E depict various views of a pitcher comprising a divider.

FIGS. 5H-5I depict various views of a lid of the filtration unit of FIGS. 5A-5G.

DESCRIPTION OF ILLUSTRATIVE EMBODIMENTS

Figure 1A:
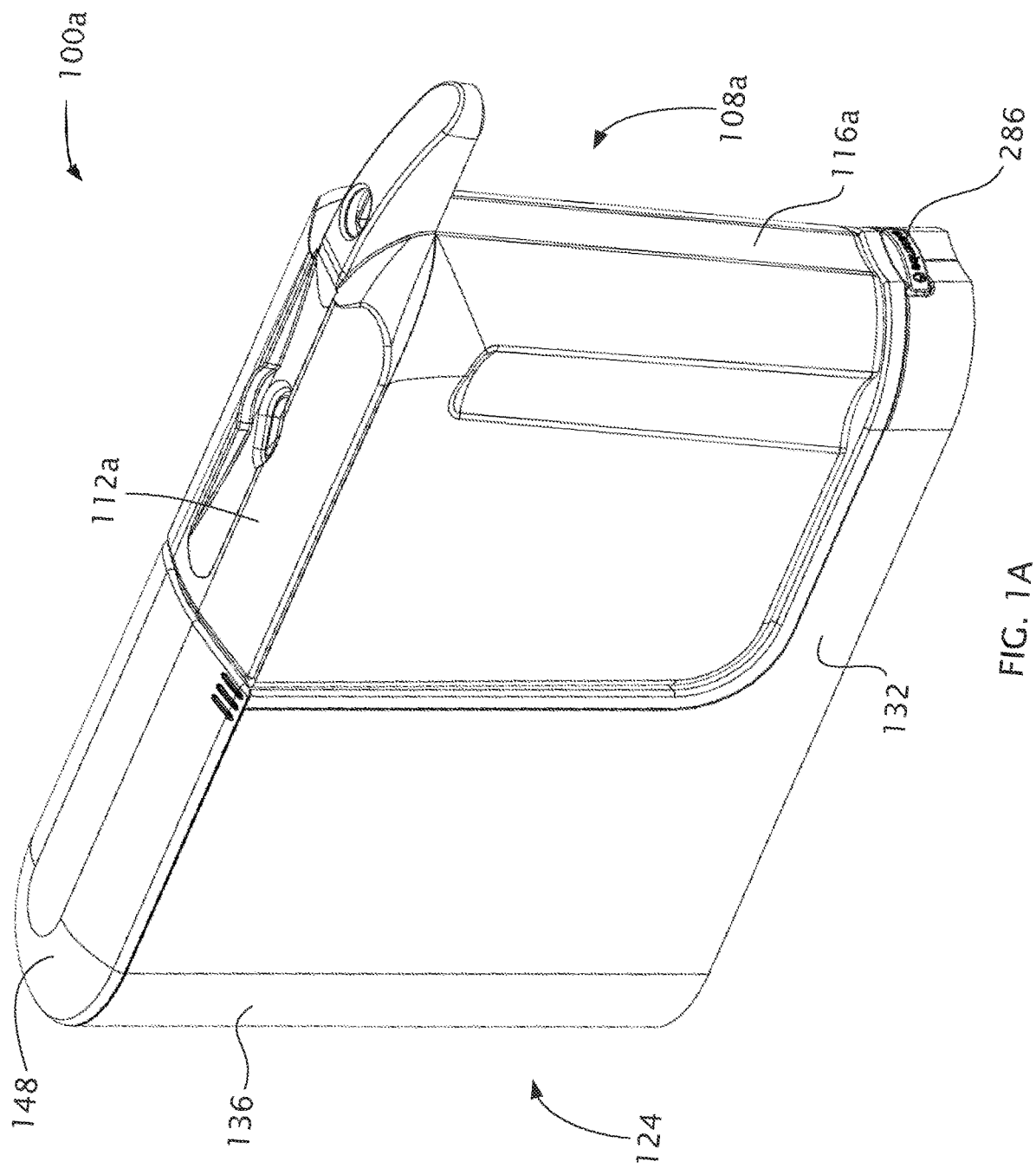
FIGS. 1A-1B depict a perspective view of a first embodiment of the present filtration systems with a pitcher coupled to a filtration unit.

The terms "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

The term "detect" (and any form of detect, such as "detects," "detected," and "detecting") is used broadly throughout this disclosure to include receiving information, obtaining or gathering of information, and any calculations for and/or manipulations of such information that may result in additional information. The term should include terms such as measuring, identifying, receiving, obtaining, gathering, similar terms, and derivatives of such terms.

The term "interface" (and its derivatives, such as "interfaces," "interfaced," and "interfacing") is used broadly to describe a connection, communication, and/or interaction between two or more components, including mechanical, electrical, and magnetic connections, communications, and/or interactions.

Further, a structure (e.g., a component of an apparatus) that is configured in a certain way is configured in at least that way, but it can also be configured in other ways than those specifically described.

Referring now to the drawings, and more particularly to FIGS. 1A-2B, shown therein and designated by reference numerals 100a and 100b are two embodiments of the present filtration systems and their components. Filtration systems 100a and 100b can be used, for example, to filter tap water for drinking. In the embodiments shown, filtration systems 100a and 100b are each configured to operate with filter 104. Filter 104 can be similar in construction and/or material to the filters found in the Model AQ-4000, AQ-4025, or AQ-4035 filter assemblies (e.g., Cartridge A and/or Cartridge B of either Model) available from Aquasana, Inc., Austin, Tex., USA. As such, the filters may comprise carbon, and, more specifically, may be characterizable as activated carbon filtration filters, such as those configured to remove impurities from water. Such fitters can include one or more of the following features: an operating pressure range of 20-50 pounds per square inch, a rated capacity of 500 gallons, a maximum operating temperature of 90 degrees Fahrenheit, a maximum flow rate of 0.4 gallons per minute. The filters of this disclosure, which will be discussed below, can be coupled to and/or operate with filtration systems 100a and 100b in any suitable way, including in the ways described in detail in pending patent application No. 61/754,853, which is incorporated by reference in its entirety. Other ways in which filter 104 can be coupled to and/or operate with filtrations systems 100a and 100b are described in detail below. Further, the filtration systems and filtration units of the present application can be coupled to and/or operate with in-line carbonation systems, methods, and apparatuses. For example, in-line carbonation systems and apparatuses can be disposed between a pump and a filter casing of the present filtration systems and units, and the filtration systems and units can further comprise a CO2 source disposed therein, as described in detail by U.S. patent application Ser. No. 12/772,641 (Publication No. US 2011/0268845) and International Patent Application No. PCT/US2011/033709 (Publication No. WO/2011/139614), which are incorporated by reference in their entirety.

Figure 1B:
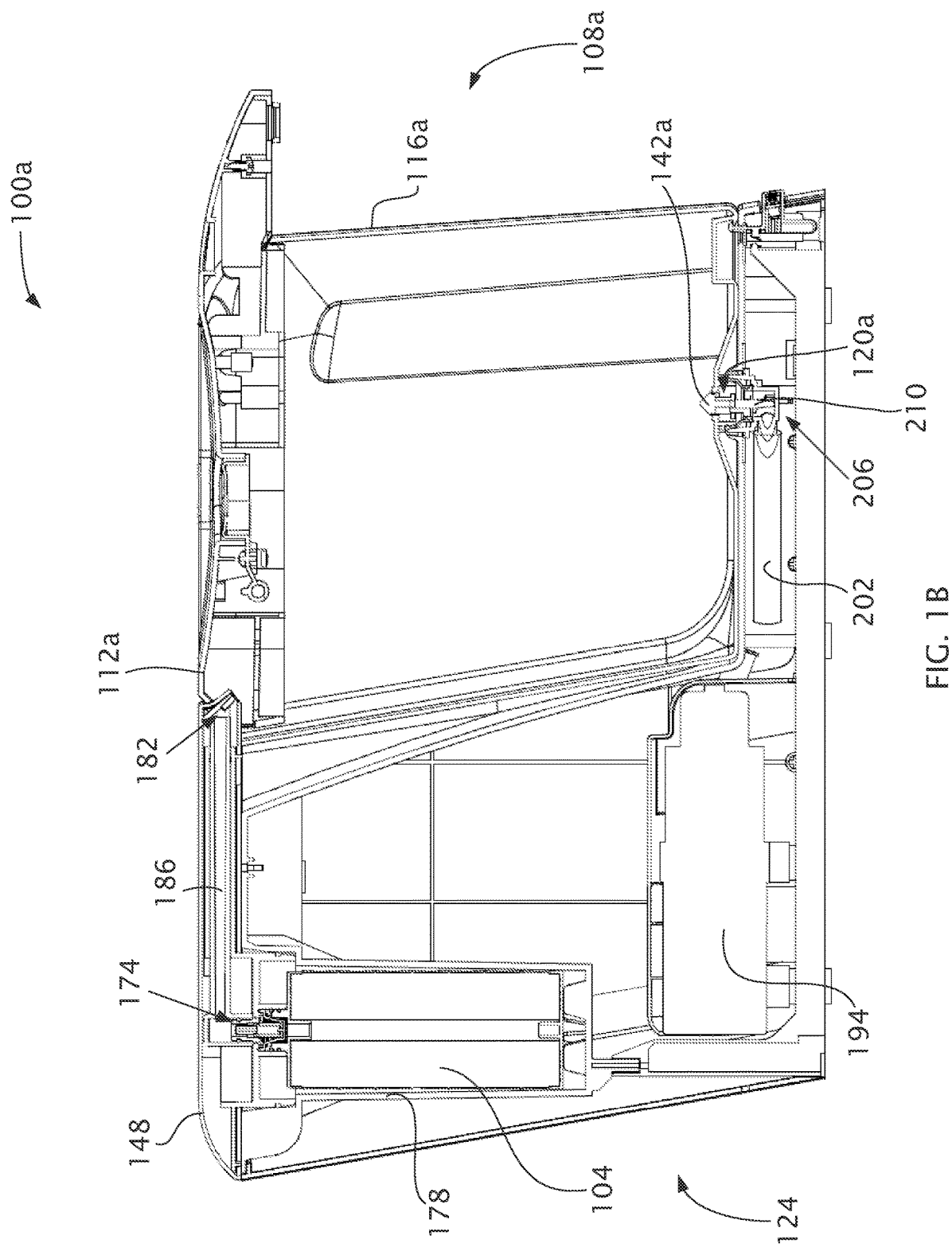
Figure 2A:
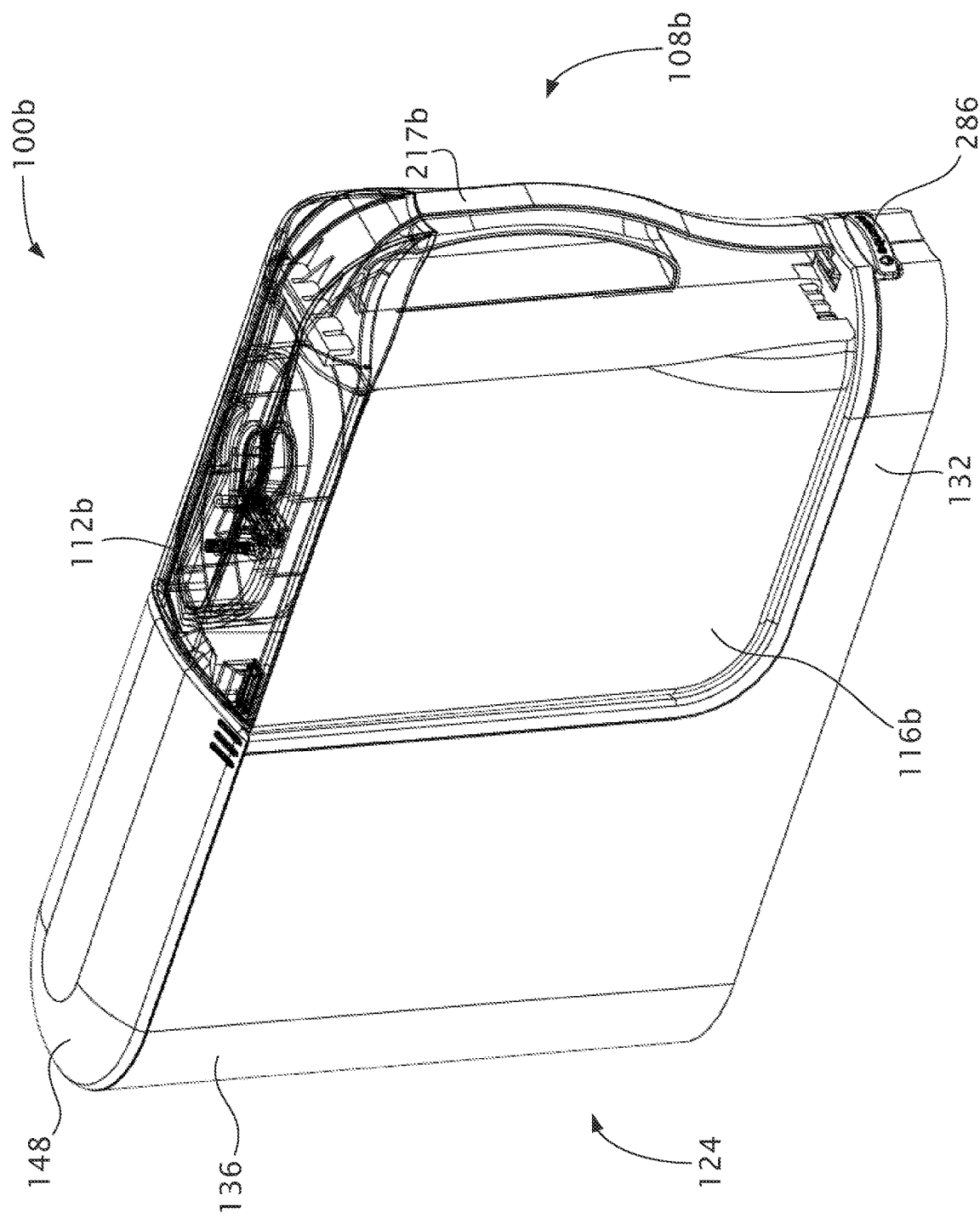

In the embodiment shown in FIGS. 1A-1B, filtration system 100a comprises pitcher 108a. Pitcher 108a comprises lid 112a, base 116a, and valve 120a. Similarly, in the embodiment shown in FIGS. 2A-2B, filtration system 100b comprises pitcher 108b. Pitcher 108b comprises lid 112b, base 116b, and valve 120b. Pitchers 108a and 108b are discussed in detail below.

In the embodiments shown in FIGS. 1A-2B, filtration systems 100a and 100b each comprises filtration unit 124. Filtration unit 124 is also depicted independent of pitchers 108a and 108b in FIGS. 5A-5G. In the embodiments shown, filtration unit 124 is configured to be coupled to pitcher 108a and pitcher 108b. In the embodiment shown in FIGS. 1A-2B and 5A-5G, filtration unit 124 comprises housing 128.

Housing 128 can comprise any suitable shape configured to at least partially accommodate pitchers 108a and 108b (e.g., a substantially L-shaped configuration, as depicted in the embodiment shown). For example, housing 128 of filtration unit 124 comprises base 132 and upper portion 136. Upper portion 136 of housing 128 comprises recessed portion 140 configured to at least partially accommodate an end of pitcher 108a and/or pitcher 108b. Lower portion 132 of housing 128 can be configured, as in the embodiment shown, to comprise a substantially similar shape to a bottom of a pitcher (e.g., substantially ovular). Further, lower portion 132 of housing 128 can comprise lip 144 configured to prevent a pitcher from moving away from filtration unit 124, for example, when a horizontal force is applied to the pitcher or filtration unit 124.

In the embodiment shown, housing 128 comprises lid 148. Lid 148 is configured to be coupled to upper portion 136 of housing 128. Lid 148 can be coupled to housing 128 in any suitable way. For example, in the embodiment shown, lid 148 comprises lid coupler 152, and lid coupler 152 comprises protrusions 156. Further, a portion of upper portion 136 of housing 128 defines opening 160, which is configured to accommodate a filter (e.g., filter 104) and/or lid coupler 152 (e.g., by comprising a diameter larger than, but substantially similar to, a filter and/or lid coupler 152). The portion of upper portion 136 that defines opening 160 has threads 166 configured to accommodate protrusions 156 of lid coupler 152. In the embodiment shown, if lid coupler 152 is oriented accordingly, lid 148 can be rotated (e.g., 5 degrees, 10 degrees, 15 degrees, or more) to permit protrusions 156 of lid coupler 152 to engage threads 166 of upper portion 136 such that lid 148 is prevented from moving away from filtration unit 124 if for example, a vertical force is applied to lid 148 or filtration unit 124.

Lid 148 of housing 128 is also configured to be coupled to a filter (e.g., filter 104). As described above, housing 128 (including lid 148) is configured to be coupled to a filter in any suitable way, including in the ways detailed in pending patent application No. 61/754,853. In the embodiment shown, lid coupler 152 comprises annular recess 170, configured to at least partially accommodate a filter (e.g., comprising a diameter larger than, but substantially similar to, a filter). Lid 148 further comprises filter coupler 174 configured to be coupled to a filter (e.g., threadably). For example, filter 104 can be coupled to lid coupler 152 by disposing filter 104 in annular recess 170 such that filter 104 is in contact with filter coupler 174. Filter 104 can then be rotated to permit filter 104 to engage filter coupler 174 (e.g., threadably) such that filter 104 is prevented from moving away from lid 148, for example, upon application of a horizontal or vertical force to filter 104 or lid 148. As described above, lid 148 can then be coupled to upper portion 136 (while filter 104 is coupled to lid 148) such that filter 104 is disposed within housing 128 and in fluid communication with at least a portion of a pump of filtration unit 124 (discussed in detail below). For example, housing 128 can comprise casing 178, which is configured to accommodate at least a portion of filter 104(e.g., by comprising a diameter larger than, but substantially similar to, a filter). Filter 104 can be disposed in casing 178, as in the embodiments shown.

Figure 5A:
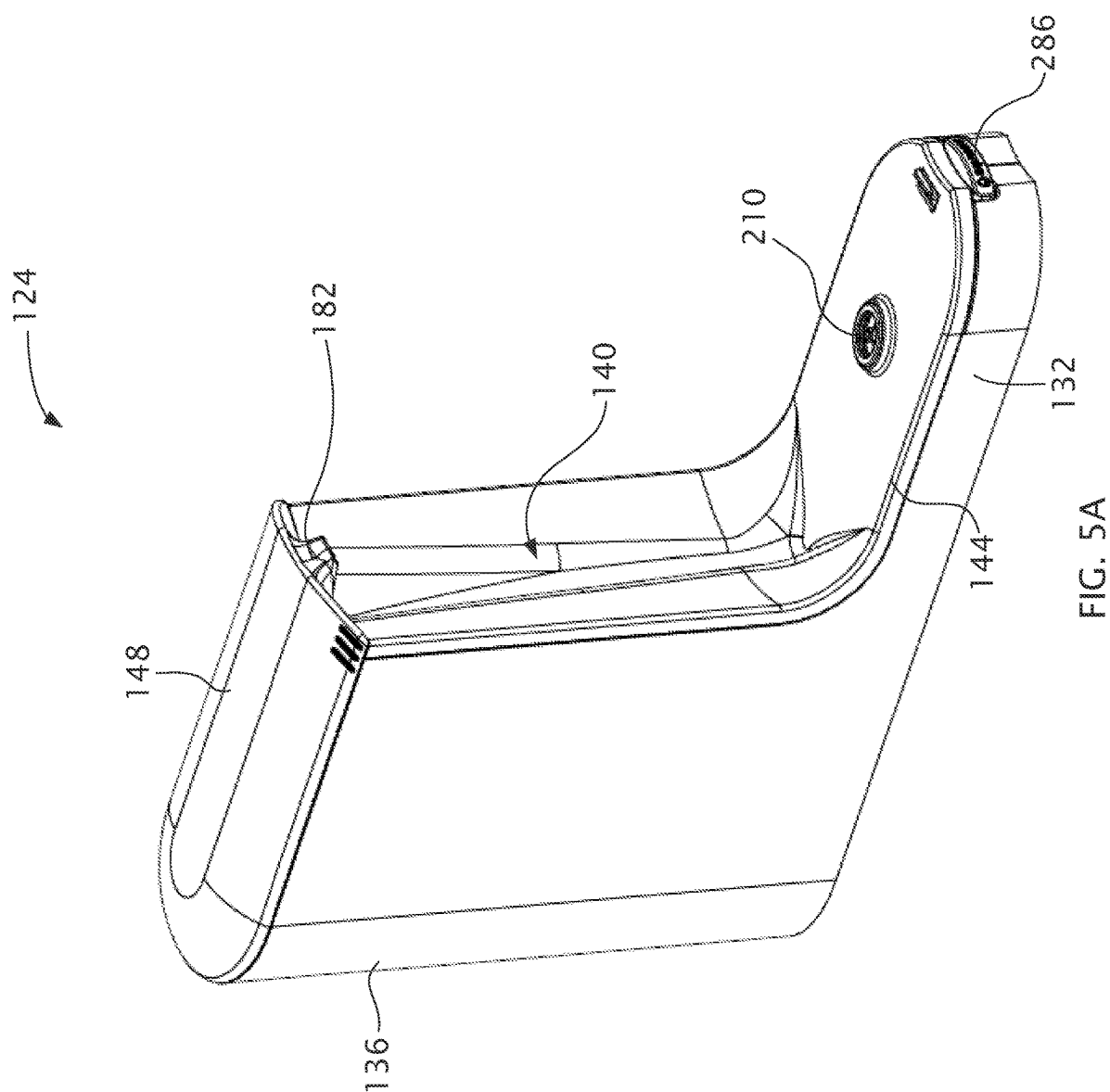
FIGS. 5A-5G depict various views of a filtration unit configured to be coupled to the pitchers of FIGS. 3A-3E and 4A-4E.
Figure 5B:
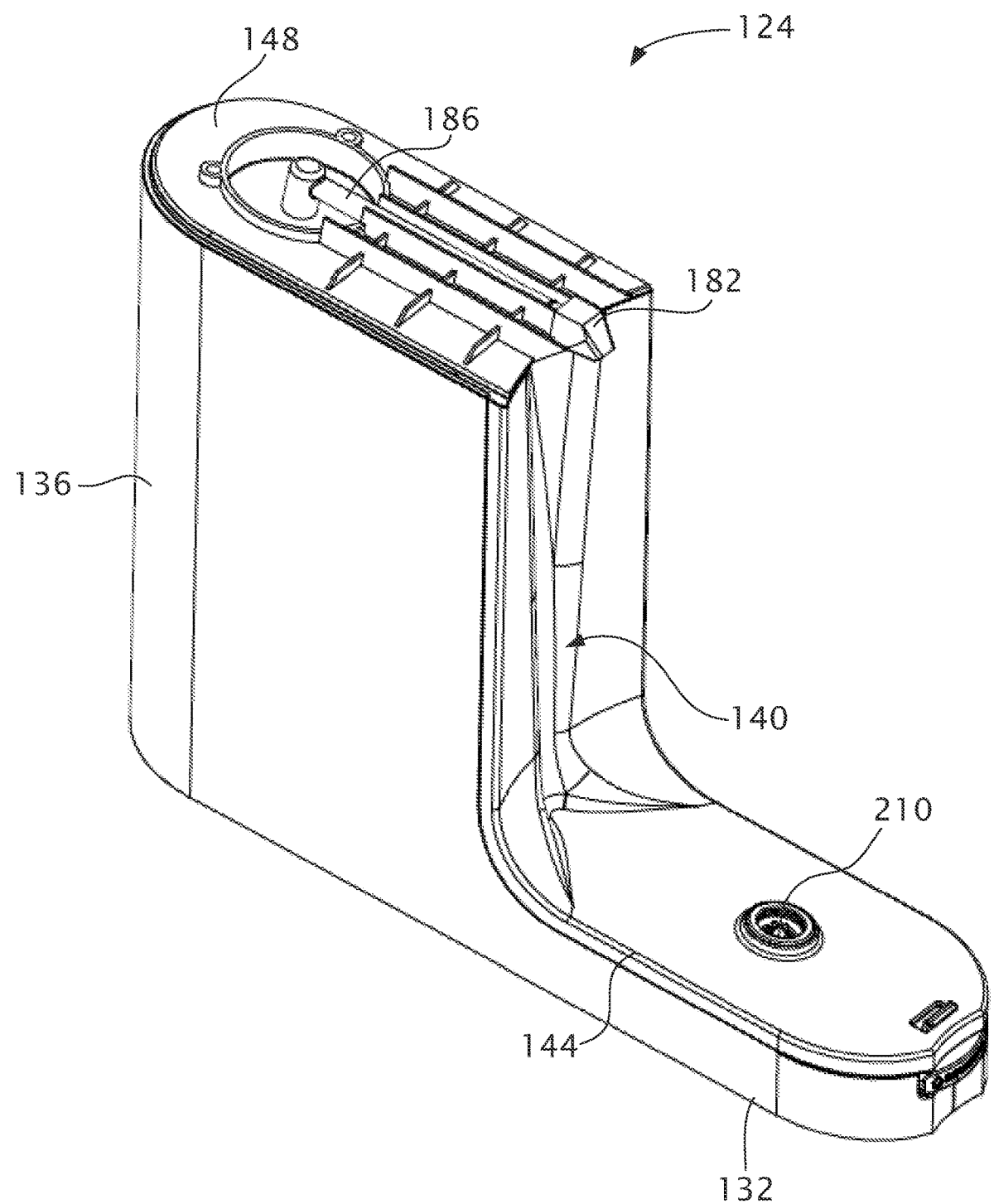
Figure 5C:
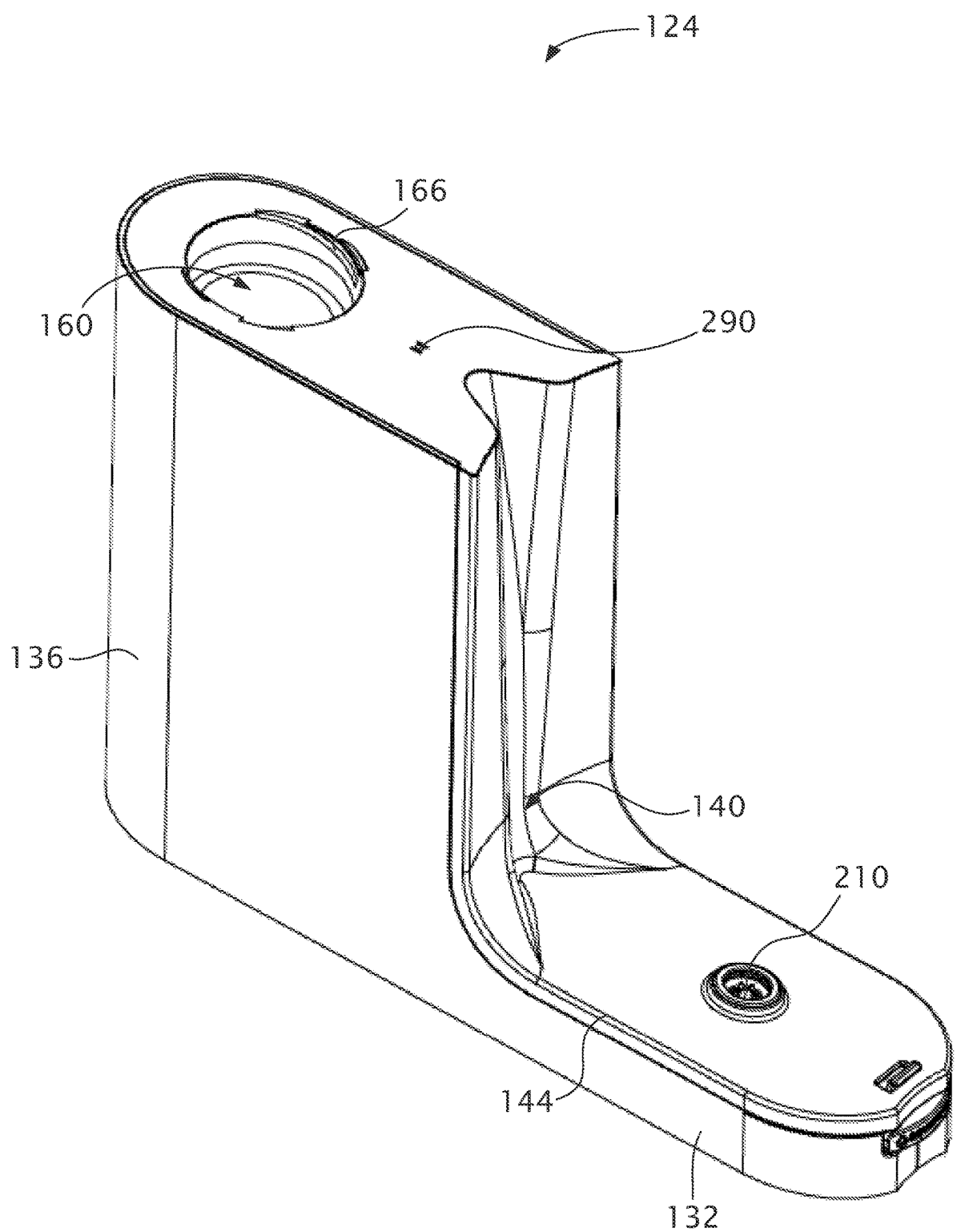
Figure 5D:
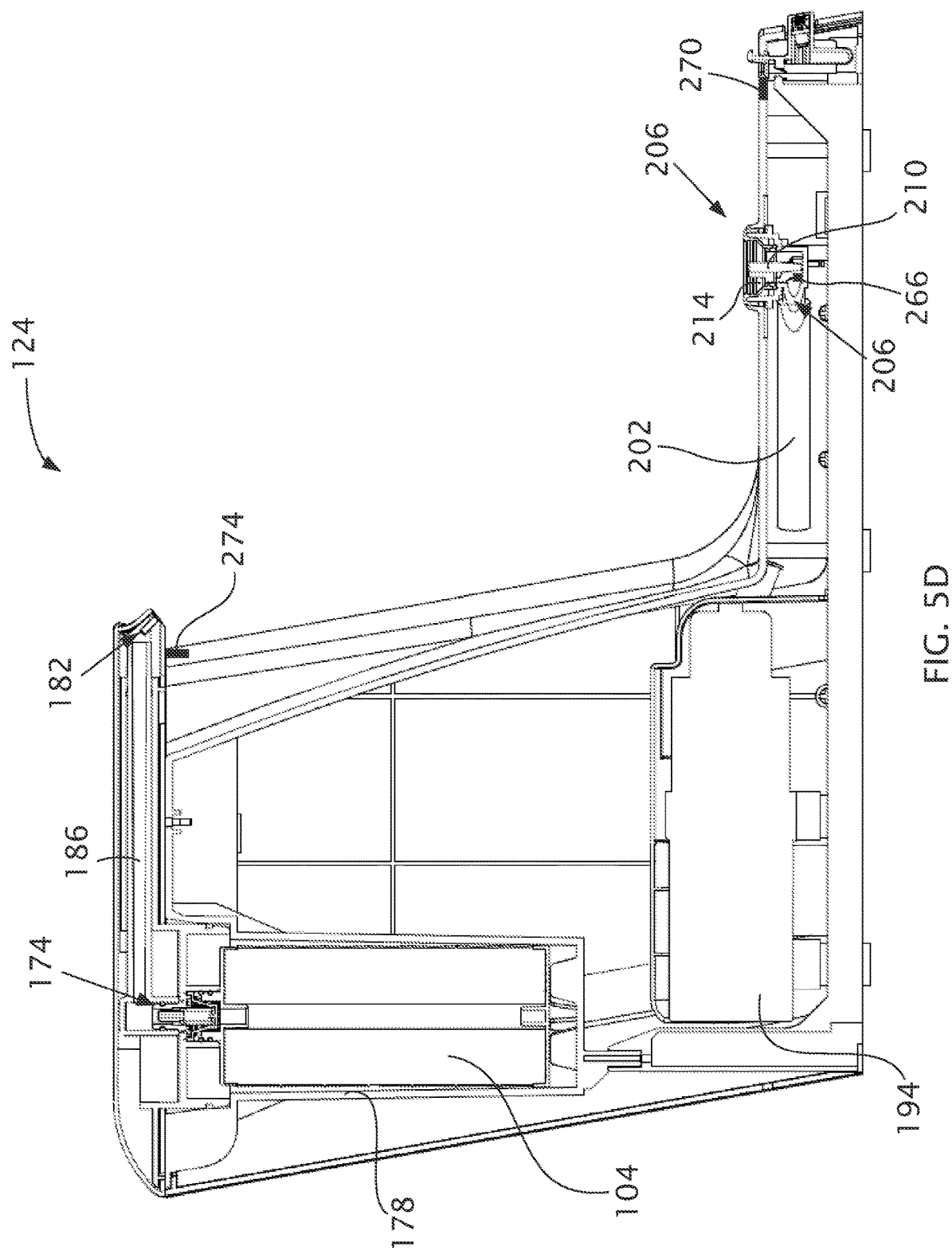
Figure 5E:
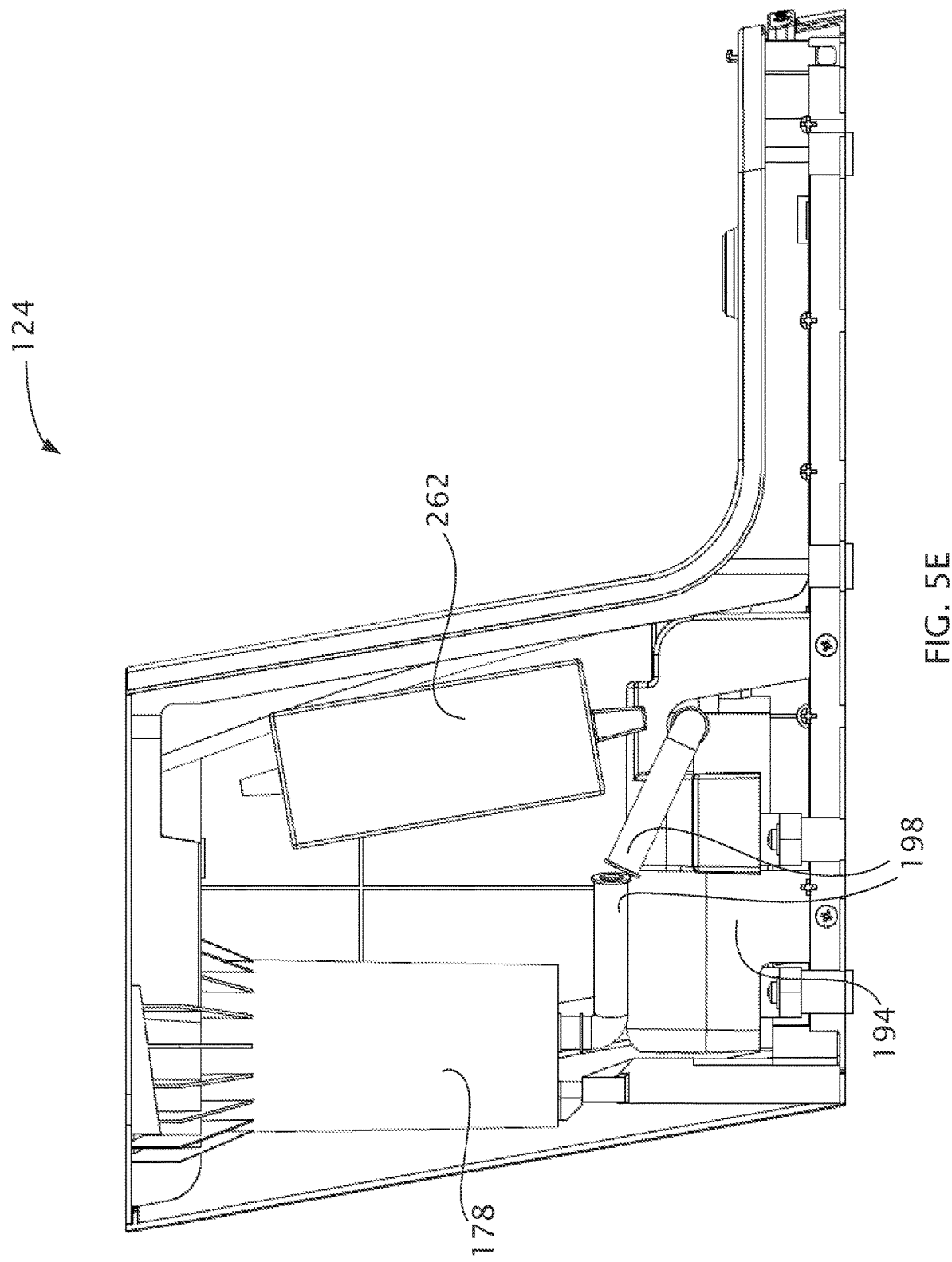
Figure 5F:
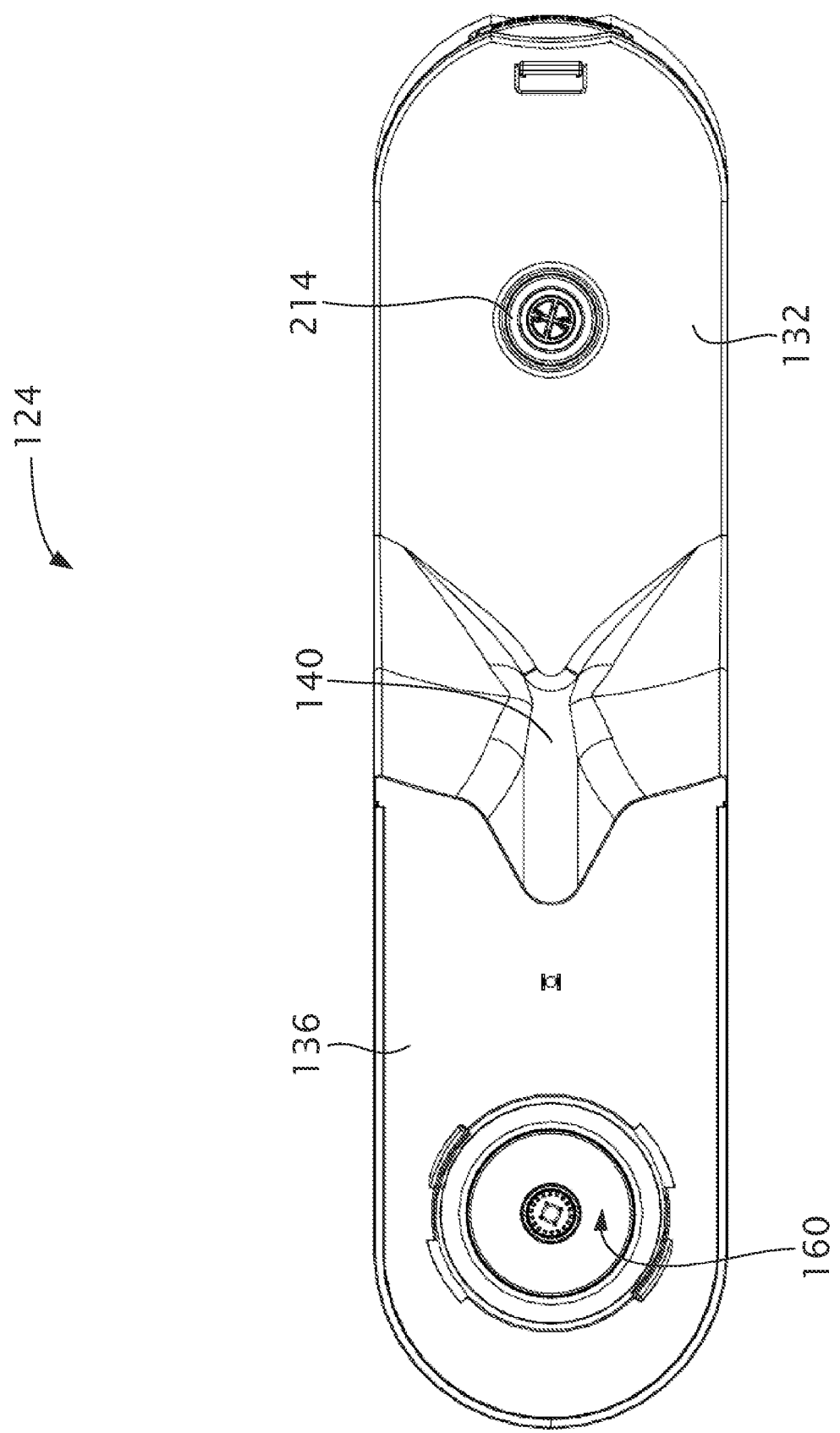
Figure 5G:
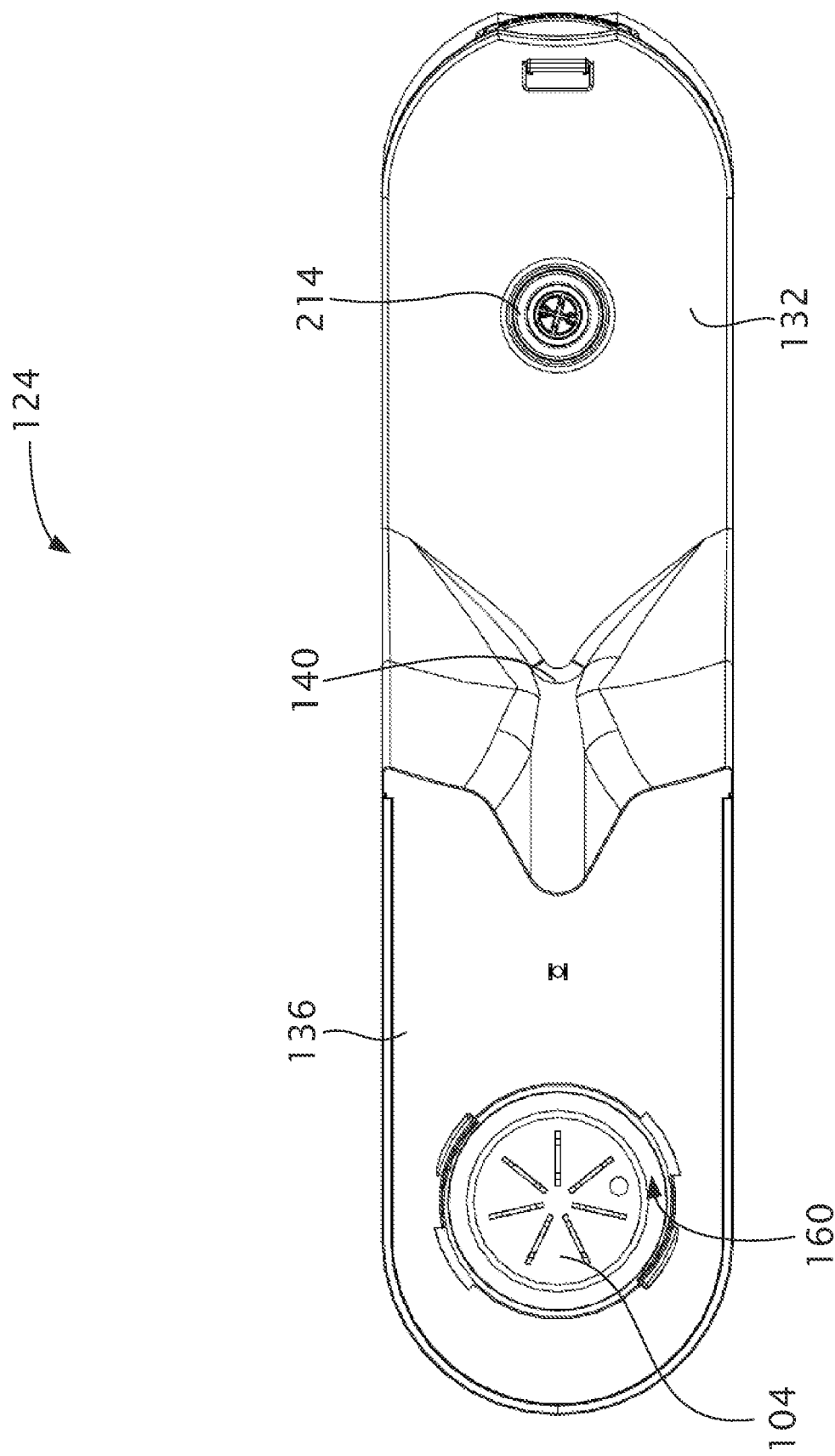
Figure 5H:
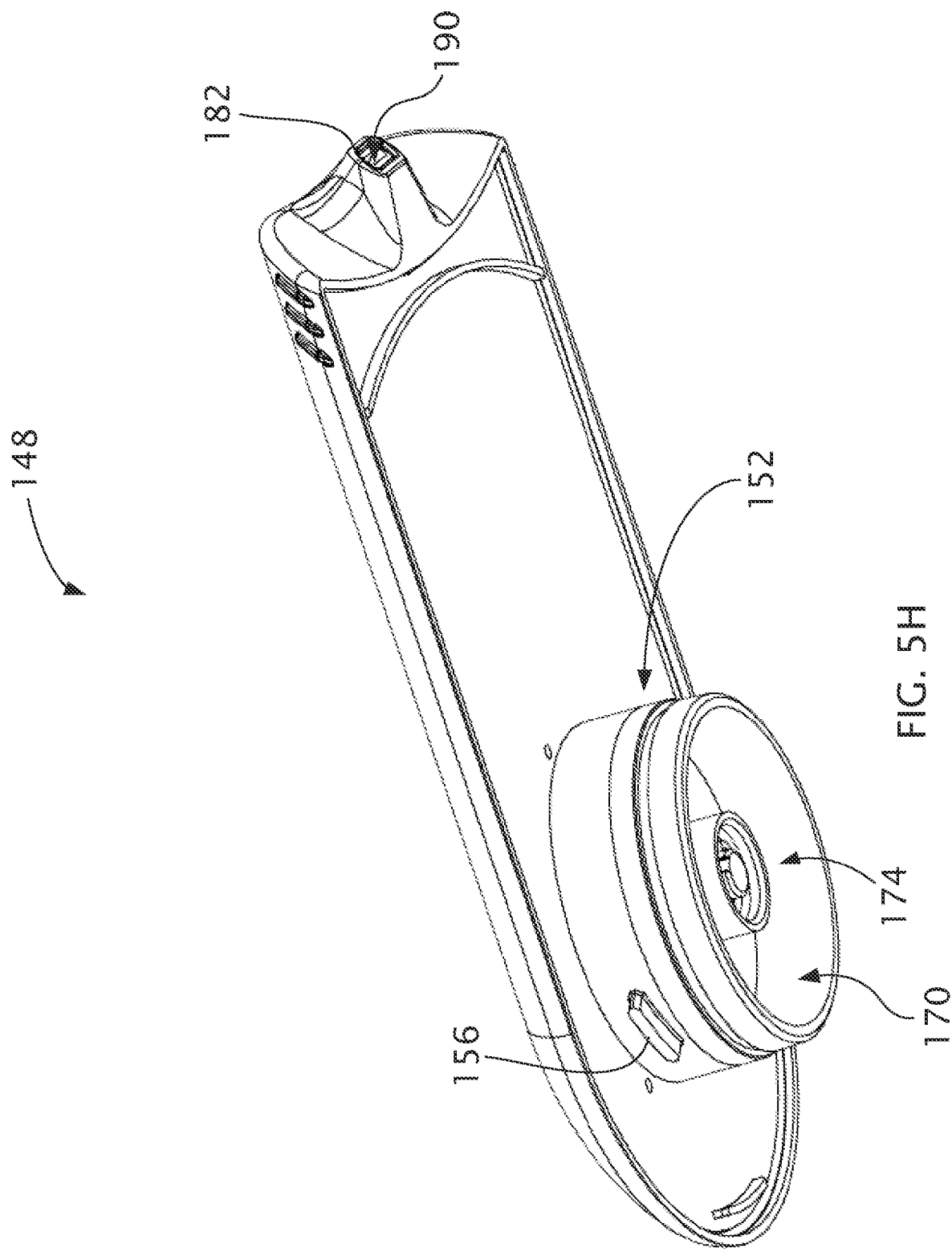
Figure 51:
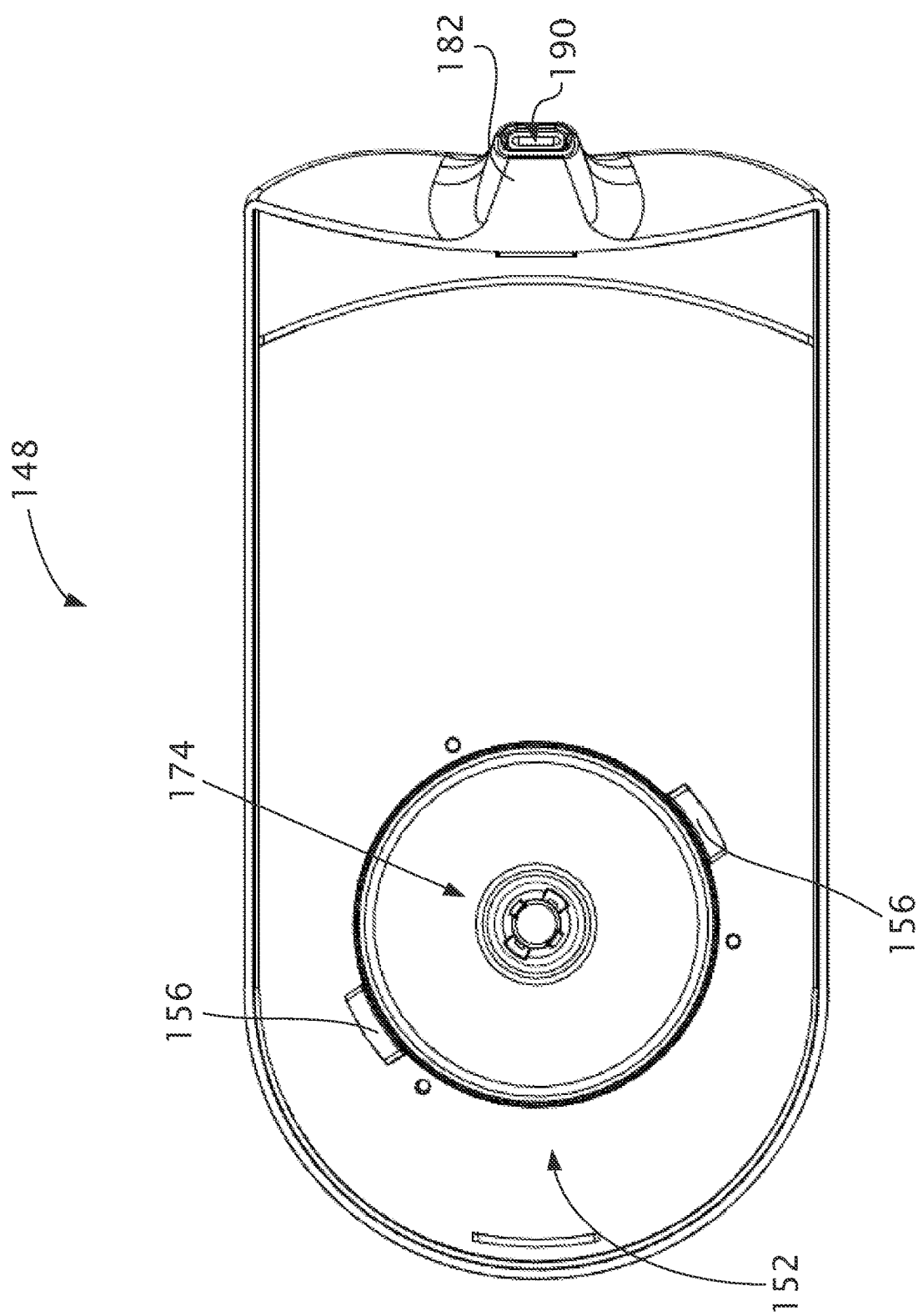

Lid 148 of housing 128 further comprises spout 182. In the embodiment shown in FIGS. 1B, 2B, and 5D, spout 182 is in fluid communication with filter coupler 174 and filter 104 via lid tubing 186. Spout 182 defines opening 190(e.g., depicted in FIGS. 5H and 5I) through which fluid can exit filtration unit 124 (e.g., after fluid exits filter 104).

In the embodiment shown, filtration unit 124 comprises pump 194. Pump 194 can be coupled to any suitable component of filtration unit 124 (such as to housing 128), and in any suitable way, including by adhesive, screws, and the like. As discussed above, at least a portion of pump 194 is configured to be in fluid communication with filter 104 and/or casing 178. For example, in the embodiment shown in FIG. 5E, tubing 198 is coupled to casing 178 and to pump 194 such that casing 178 and/or filter 104 is in fluid communication with at least a portion of pump 194. Pump 194 is also configured to be in fluid communication with pitchers 108a and 108b. For example, in the embodiment shown in FIG. 5D, tubing 202 is coupled to base entry component 206 and pump 194 such that base entry component 206 and pump 194 are in fluid communication.

In the embodiment shown, housing 128 is configured to cooperate with pitchers 108a and 108b to open a valve on the pitchers. For example, in the embodiment shown, nipple 210 is coupled to base entry component 206 and is configured to interact with a valve on pitchers 108a and 108b to permit the valve to move into an open configuration (e.g., so that fluid in pitchers 108a and 108b, if any, is permitted to exit the pitchers into base entry component 206 of filtration unit 124). Base entry component 206 can comprise reservoir seal 214 (e.g., an O-ring) configured to substantially prevent fluid from exiting filtration systems 100a and 100b (e.g., by providing a fluid-tight seal). If a pitcher (e.g., pitcher 108a and/or 108b) having a valve and holding fluid is coupled to filtration unit 124 such that the pitcher's valve moves into an open configuration, fluid can exit the pitcher into a portion of base entry component 206. If pump 194 is activated, pump 194 pumps fluid in base entry component 206 (and from pitcher 108a and/or 108b) through tubing 202 and tubing 198 and into casing 178 (holding filter 104, if filter 104 is disposed in casing 178). Pump 194 then pumps fluid through filter coupler 174 and lid tubing 186 such that fluid can exit filtration unit 124 through spout 182.

As discussed above, in the embodiments shown in FIGS. 1A-1B and 3A-3E, pitcher 108a comprises lid 112a and base 116a. Base 116a is configured to be coupled to lid 112a such that base 116a and lid 112a cooperate to define a container configured to hold fluid (e.g., water). In the embodiment shown, lid 112a and base 116a also cooperate to define first opening 216a through which fluid can enter and exit the pitcher. In some embodiments, pitcher 108a can comprise a handle configured to permit a user to grip pitcher 108a (as shown with pitcher 108b). Similarly to pitcher 108b, a handle of pitcher 108a can be coupled to lid 112a and/or base 116a.

In the embodiment shown, lid 112a defines second opening 218a that permits fluid to enter pitcher 108a In the embodiment shown, lid 112a comprises tab 222a, which is biased to a closed configuration (e.g., via lever 226a and spring 230a). While in the closed configuration, tab 222a substantially prevents fluid from entering or exiting pitcher 108a. Upon application of, for example, a vertical force to tab 222a (which stretches spring 230a), tab 222a is configured to move to an open configuration to permit fluid to enter or exit pitcher 108a (e.g., through second opening 218a). If the vertical force applied to tab 222a is released, spring 230a is permitted to relax, and tab 222a returns to a closed configuration.

Figure 3A:
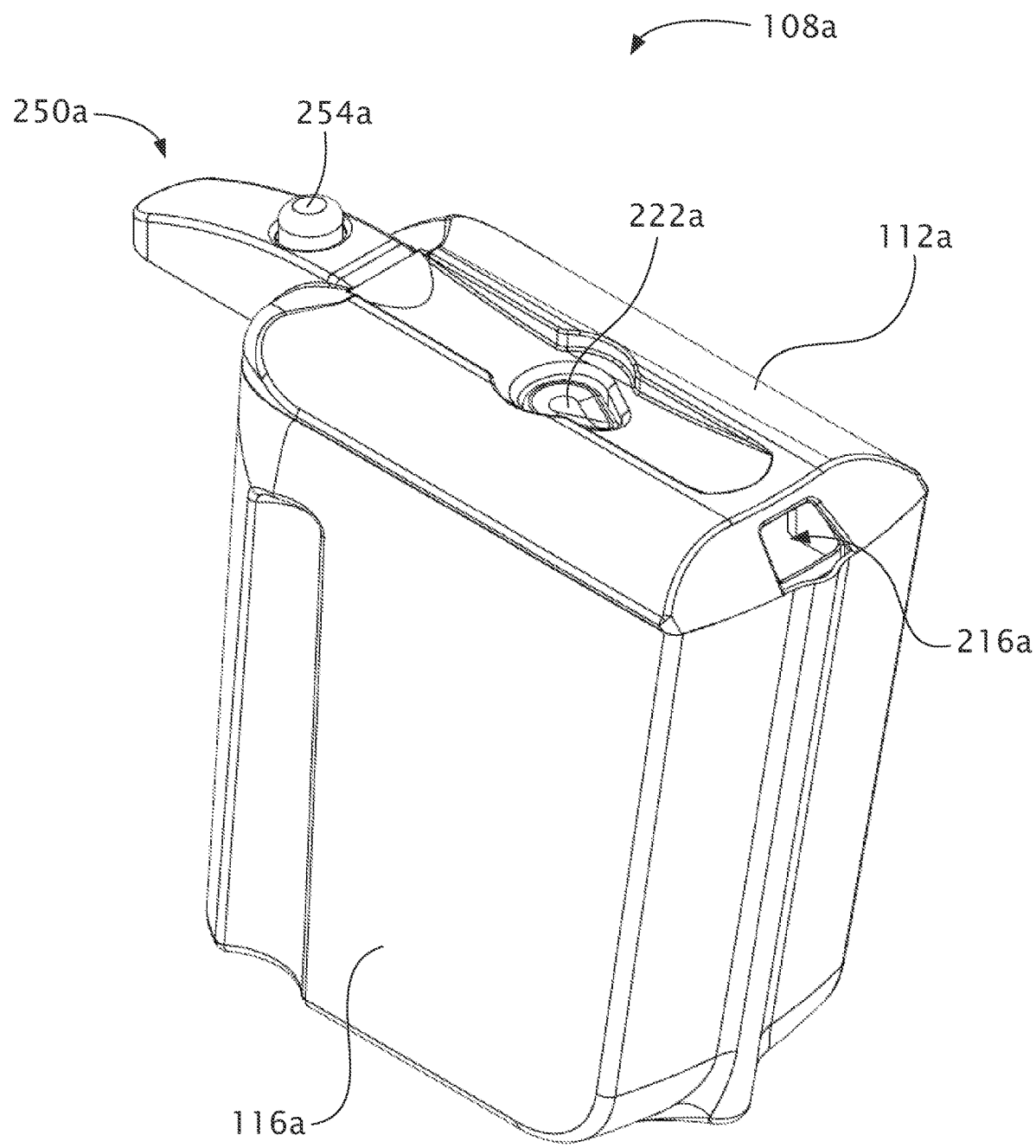
Figure 3B:
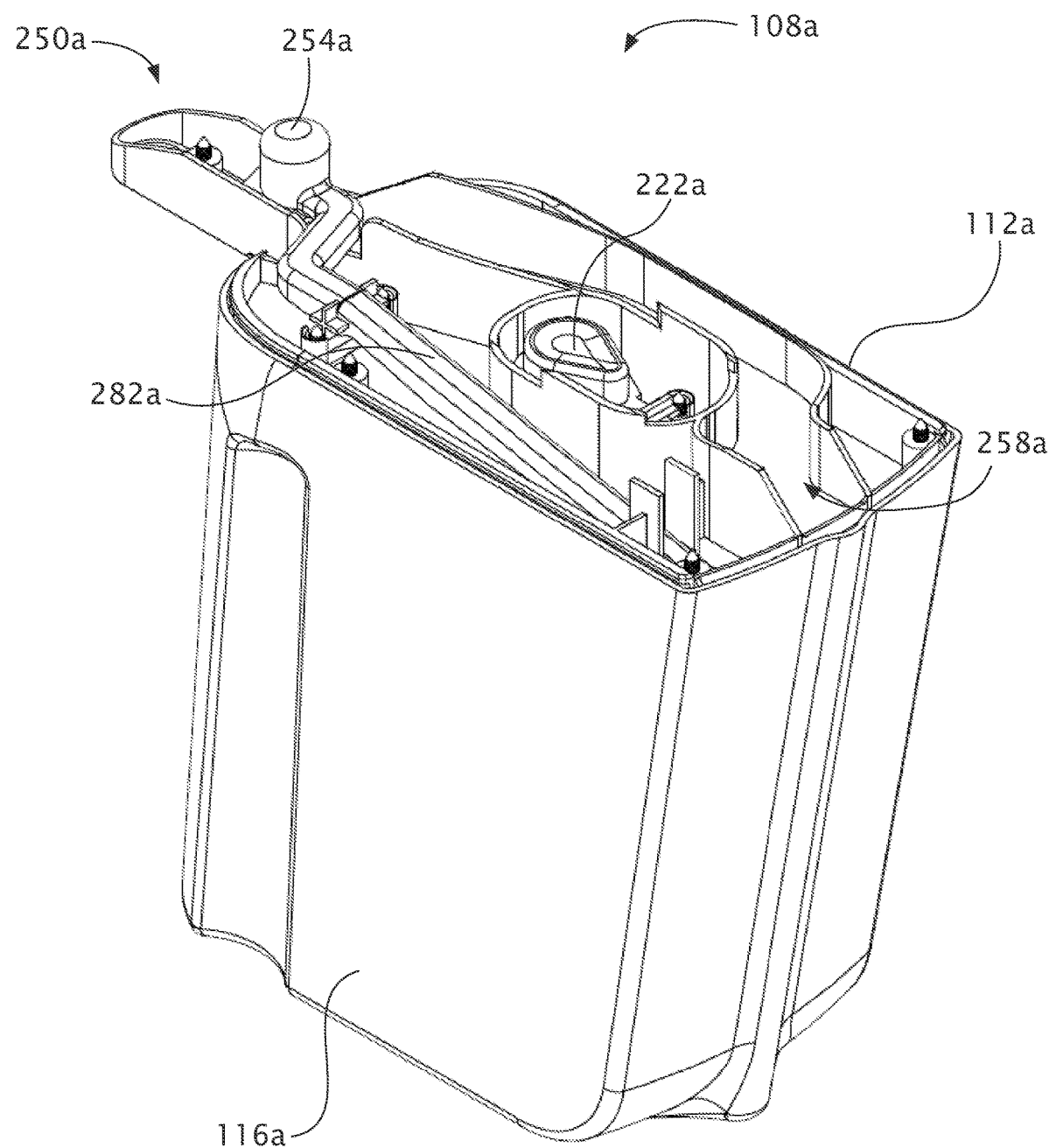
Figure 3C:
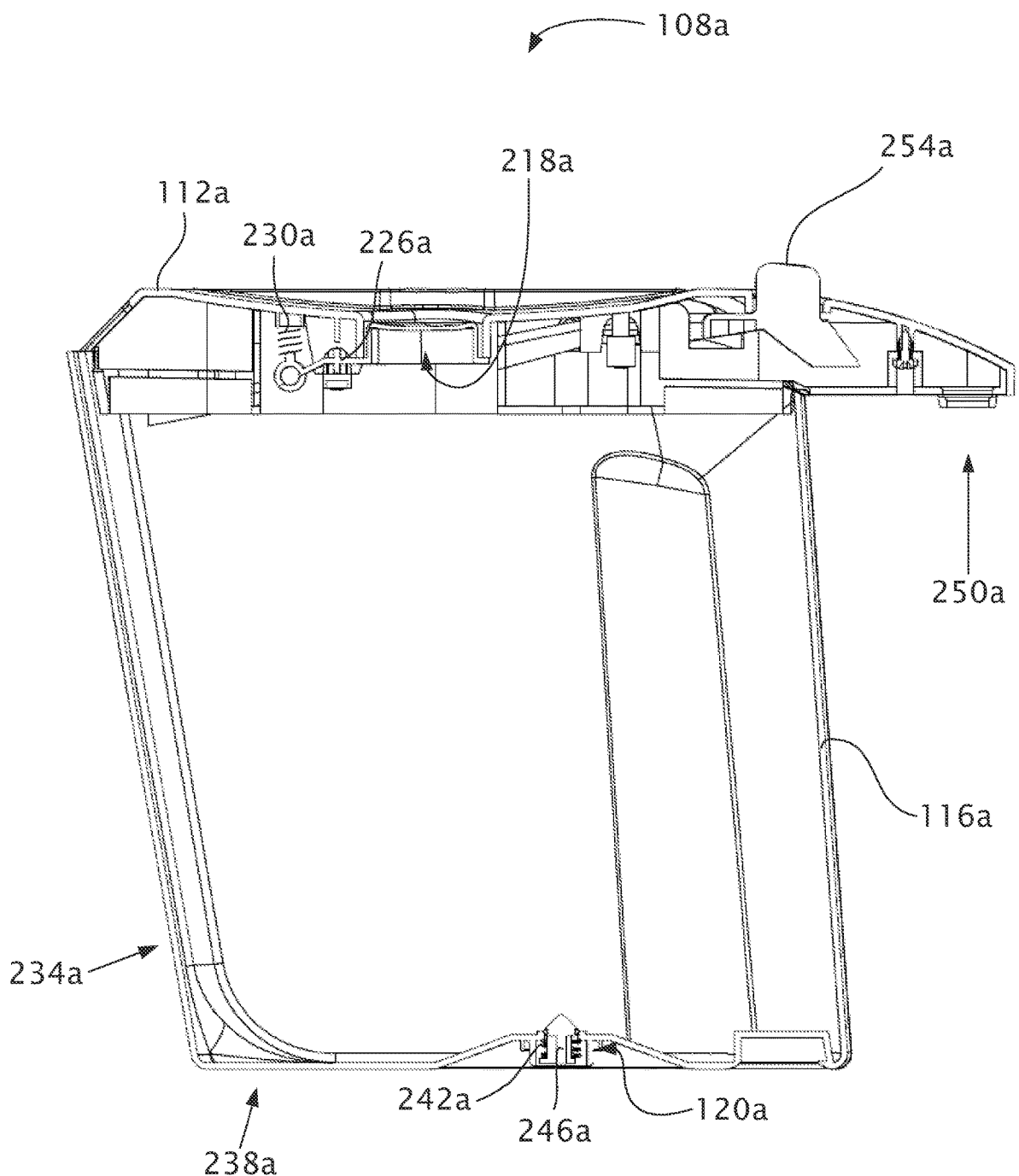
Figure 3E:
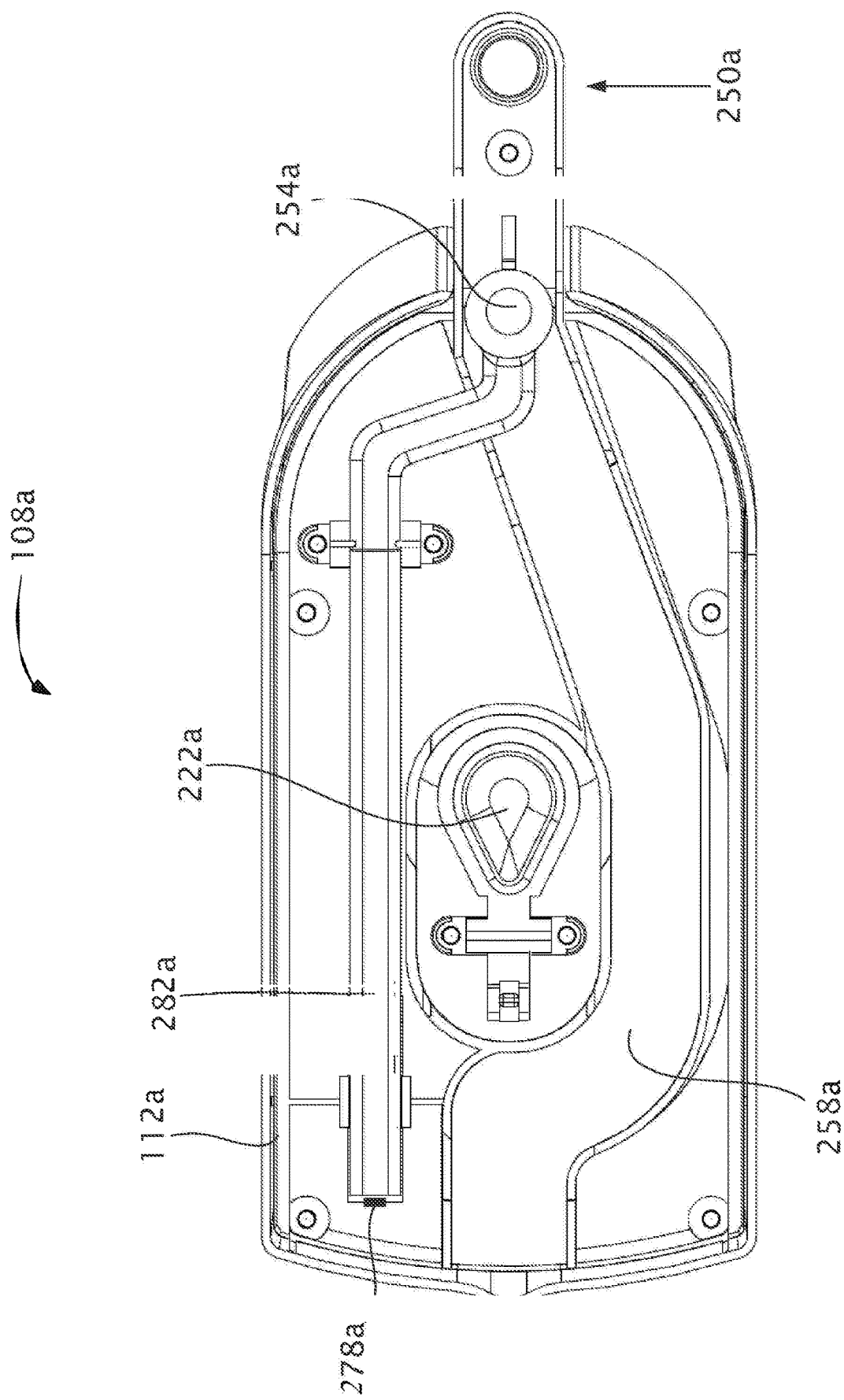

In the embodiment shown, base 116a comprises sidewall 234a and bottom 238a (e.g., as depicted in FIG. 3C). In some embodiments, sidewall 234a can be coupled to bottom 238a; and in other embodiments, sidewall 234a and bottom 238a are integral (e.g., as in the embodiment shown). In the embodiment shown, bottom 238a of base 116a of pitcher 108a comprises valve 120a. Valve 120 a is configured to be in an open configuration when pitcher 108a is coupled to filtration unit 124 (e.g., permitting fluid to enter filtration unit 124 through valve 120a), and valve 120a is configured to be in a closed configuration when pitcher 108a is not coupled to filtration unit 124 (e.g., preventing fluid from exiting pitcher 108a through valve 120a). In the embodiment shown, bottom 238a of base 116a defines an opening through which fluid can exit pitcher 108a. Plunger 242a is disposed in the opening defined by bottom 238a of base 116a to prevent fluid from exiting pitcher 108a. In the embodiment shown, spring 246a biases valve 120a to a closed configuration (e.g., by applying a force to plunger 242a). When pitcher 108a is coupled to filtration unit 124, nipple 210 of filtration unit 124 applies a force to plunger 242a, compressing spring 246a to permit fluid to move through valve 120a and into base entry component 206. If pitcher 108a is decoupled from filtration unit 124, the force applied to plunger 242a by nipple 210 is released, and spring 246a is permitted to relax, biasing valve 120a to a closed configuration.

In some embodiments (e.g., FIGS. 1A-1B and 3A-3E), pitcher 108a (and, more specifically, lid 112a) comprises dispenser 250a. Dispenser 250a is configured such that if pitcher 108a is coupled to filtration unit 124 and dispenser 250a is activated (e.g., by a motion sensor, by pressing button 254a, and the like), pump 194 pumps fluid from pitcher 108a through filtration unit 124 (e.g., to be filtered), out of spout 182, and into pitcher 108a to be dispensed. For example, after fluid exits spout 182, fluid enters pitcher 108a (and, more specifically, lid 112a) through second opening 216a and into passage 258a, which is in fluid communication with dispenser 250a, such that fluid can exit pitcher 108a.

As above, in the embodiments shown in FIGS. 2A-2B and 4A-4E, pitcher 108b comprises lid 112b and base 116b. Base 116b is configured to be coupled to lid 112b such that base 116b and lid 112b cooperate to define a container configured to hold fluid (e.g., water). In the embodiment shown, lid 112b and base 116b also cooperate to define first opening 216b through which fluid can enter and exit the pitcher. In some embodiments, pitcher 108b comprises handle 117b configured to permit a user to maneuver pitcher 108b. Handle 117b can be coupled to lid 112b and/or base 116b, as depicted.

In the embodiment shown, lid 112b defines second opening 218b, which permits fluid to enter pitcher 108b. In the embodiment shown, lid 112b comprises tab 222b that is biased to a closed configuration (e.g., via lever 226b and spring 230b). While in the closed configuration, tab 222b substantially prevents fluid from entering or exiting pitcher 108b. Upon application of, for example, a vertical force to tab 222b (which stretches spring 230b), tab 222b is configured to move to an open configuration to permit fluid to enter or exit pitcher 108b (e.g., through second opening 218b). If the vertical force applied to tab 222b is released, spring 230b is permitted to relax, and tab 222b returns to a closed configuration.

In the embodiment shown, base 116b comprises sidewall 234b and bottom 238b (e.g., as depicted in FIG. 4C). In some embodiments, sidewall 234b can be coupled to bottom 238b; and in other embodiments, sidewall 234b and bottom 238b are integral (e.g., as in the embodiment shown). In the embodiment shown, bottom 238b of base 116b of pitcher 108b comprises valve 120b. Valve 120b is configured to be in an open configuration when pitcher 108b is coupled to filtration unit 124 (e.g., permitting fluid to enter filtration unit 124 through valve 120b), and valve 120b is configured to be in a closed configuration when pitcher 108b is not coupled to filtration unit 124 (e.g., preventing fluid from exiting pitcher 108b through valve 120b). In the embodiment shown, bottom 238b of base 116b defines an opening through which fluid can exit pitcher 108b. Plunger 242b is disposed in the opening defined by bottom 238b of base 116b to prevent fluid from exiting pitcher 108b. In the embodiment shown, spring 246b biases valve 120b to a closed configuration (e.g., by applying a force to plunger 242b). When pitcher 108b is coupled to filtration unit 124, nipple 210 of filtration unit 124 applies a force to plunger 242b, compressing spring 246b to permit fluid to move through valve 120b and into base entry component 206. If pitcher 108b is decoupled from filtration unit 124, the force applied to plunger 242b by nipple 210 is released, and spring 246b is permitted to relax, biasing valve 120b to a closed configuration.

Figure 4A:
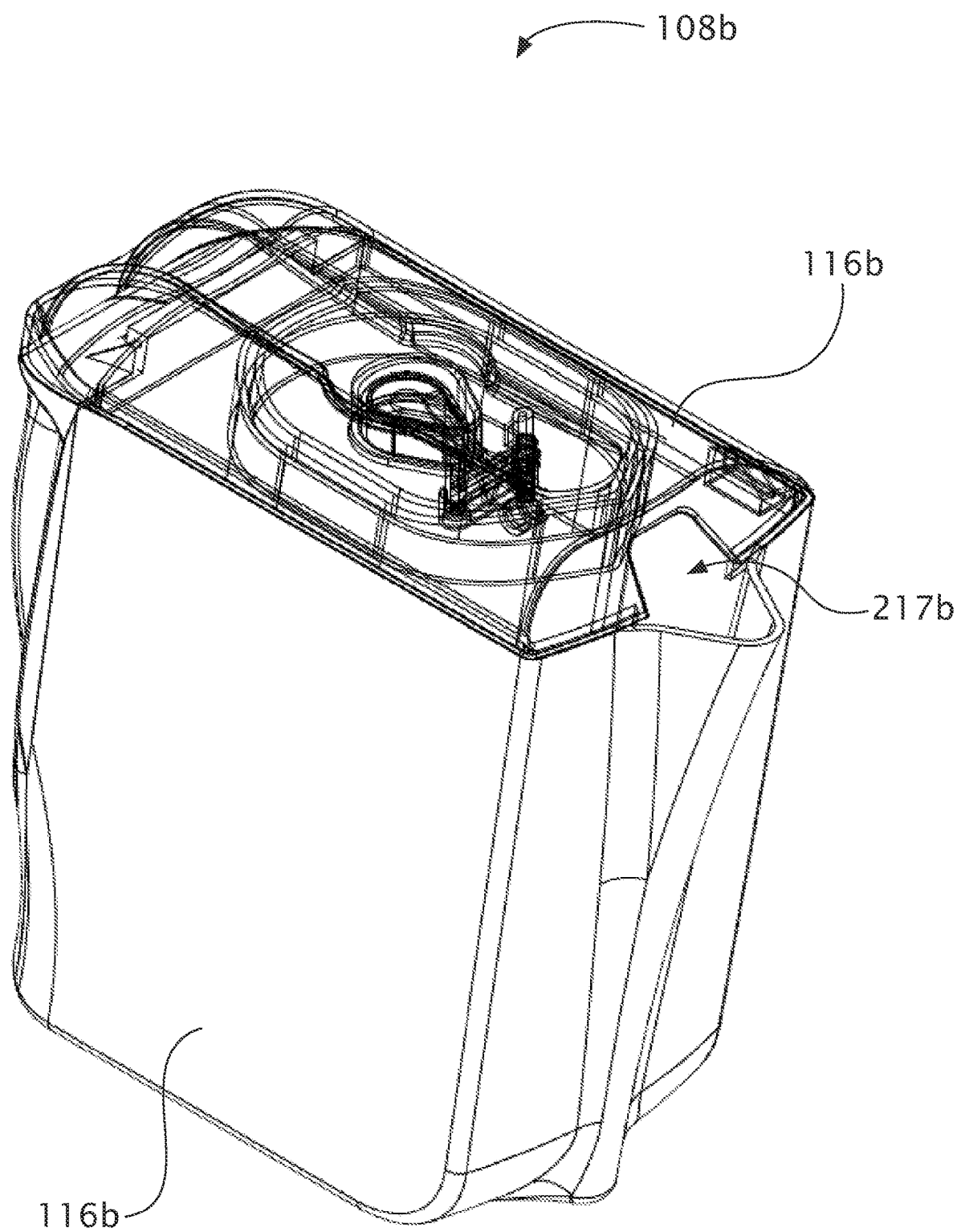
Figure 4B:
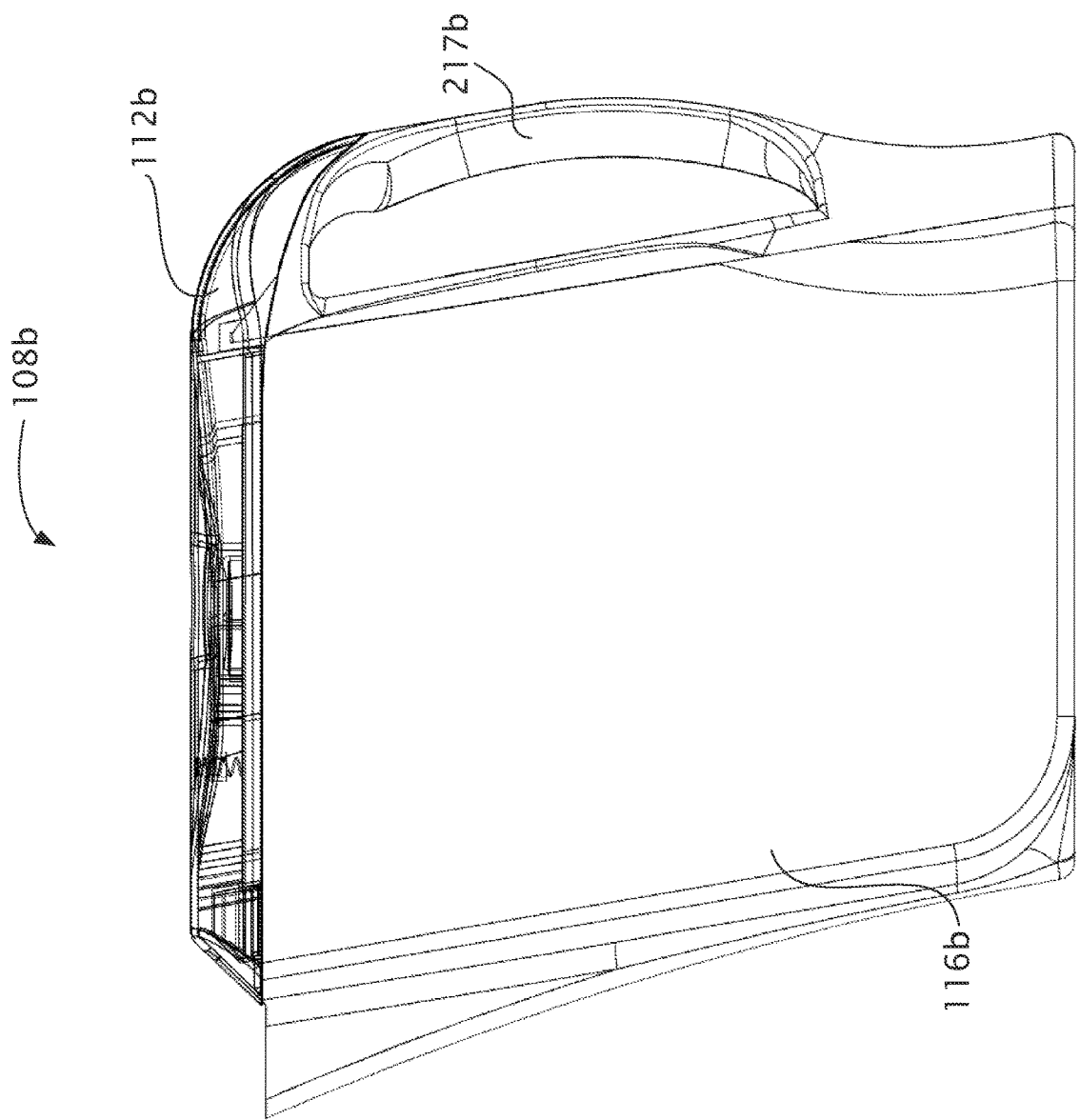
Figure 4D:
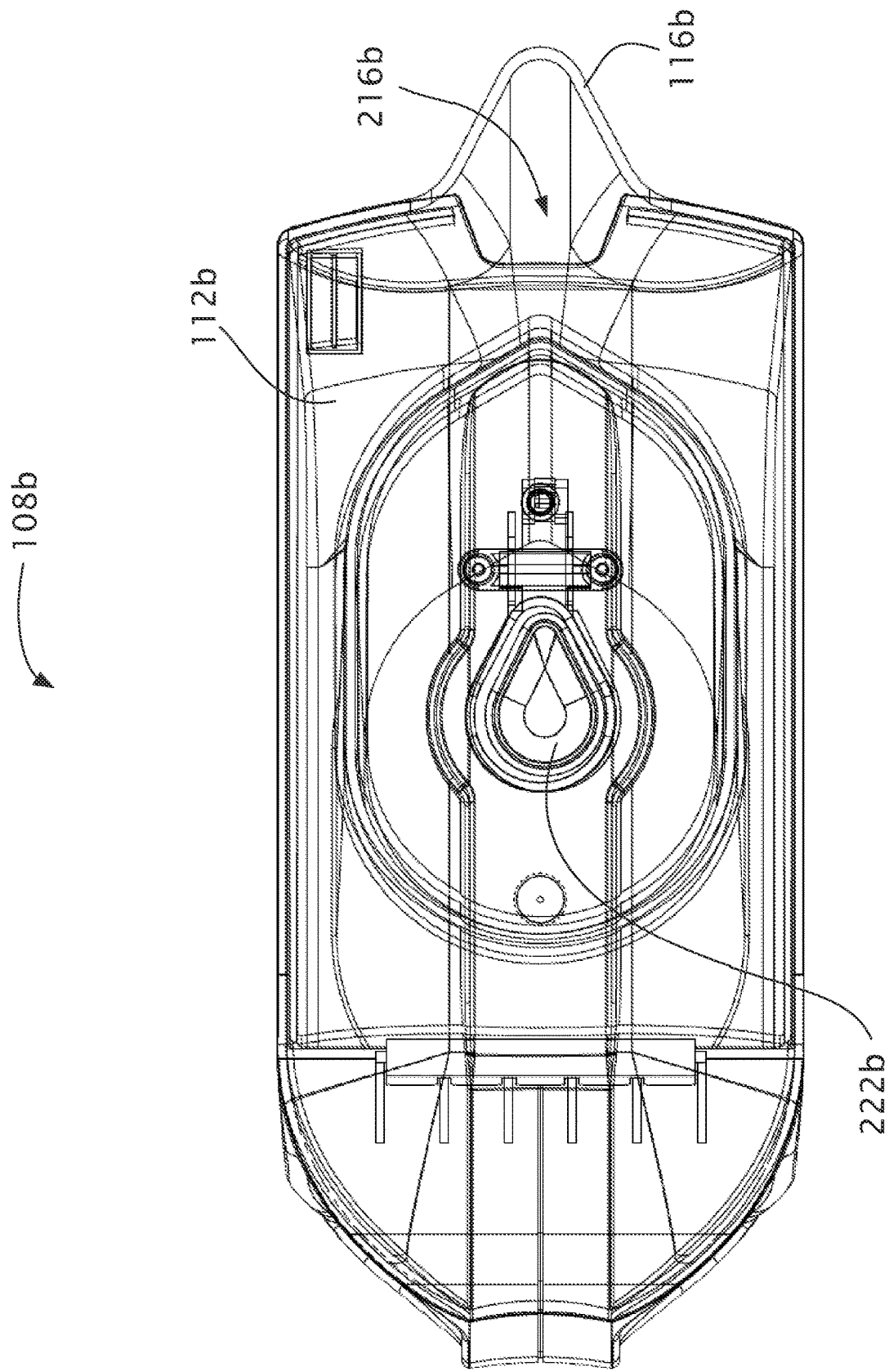
Figure 4E:
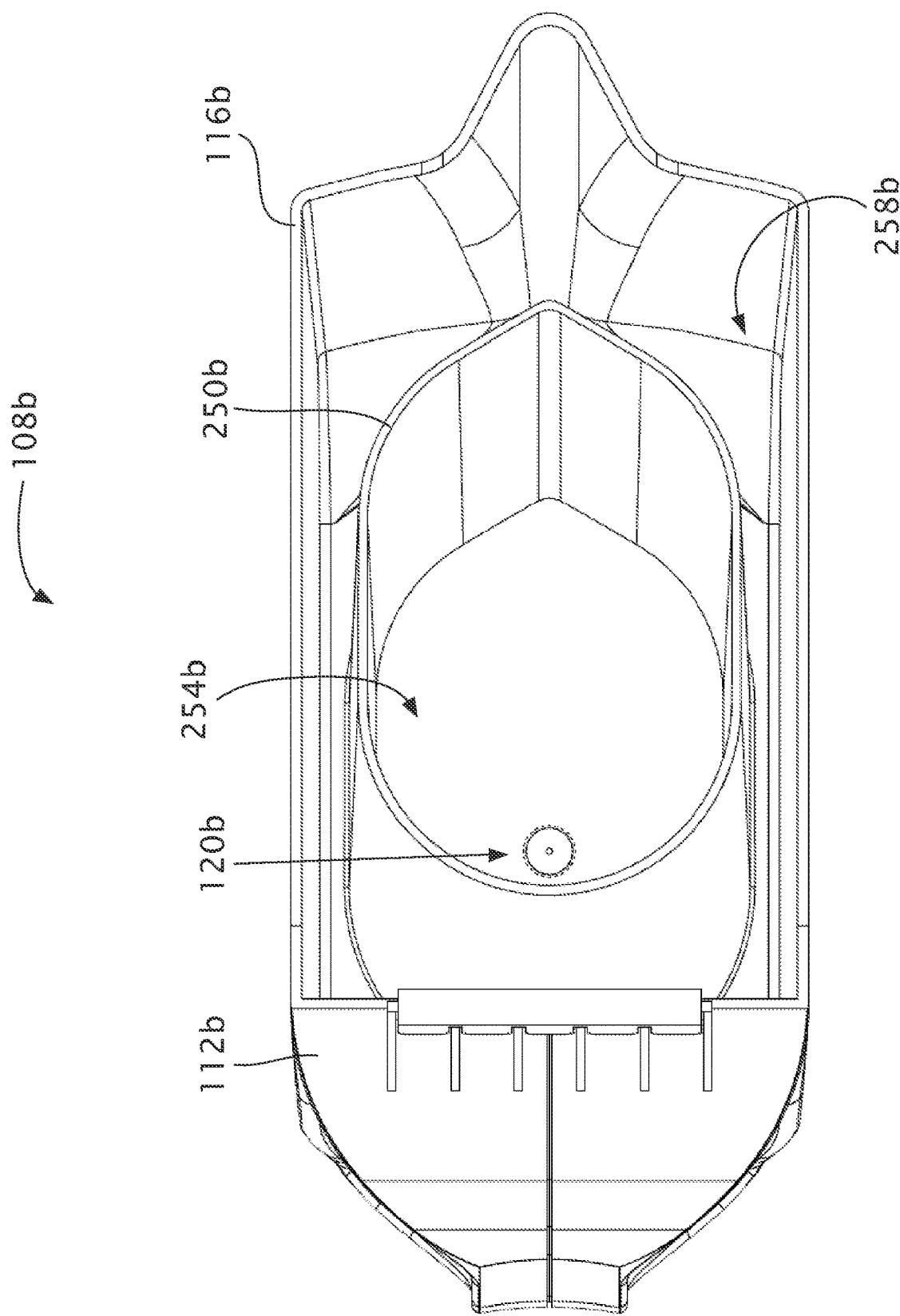

In some embodiments (e.g., FIGS. 2A-2B and 4A-4E), pitcher 108b (and, more specifically, base 116b) comprises divider 250b configured to divide the container formed by base 116b and lid 112b into first compartment 254b and second compartment 258b, where divider 250b is oriented such that first compartment 254b and second compartment 258b each comprises at least a portion of bottom 238b of base 116b (depicted in FIG. 4E). Divider 250b can be coupled to any portion of pitcher 108b, such as sidewall 234b or bottom 238b (as in the embodiment shown). Divider 250b can be coupled to pitcher 108b in any suitable way. In some embodiments, divider 250b is integral with bottom 238b of base 116b of pitcher 108b. In the embodiment shown, divider 250b is substantially perpendicular to bottom 238b of pitcher 108b.

In some embodiments, divider 250b is configured such that first compartment 254b is oriented within second compartment 258b. In some embodiments, divider 250b is substantially cylindrical and does not intersect sidewall 234b of base 116b (as in the embodiment shown). In some embodiments, first compartment 254b and second compartment 258b can comprise substantially the same volume; and in other embodiments, first compartment 254b can comprise a smaller volume than second compartment 258b, and vice versa. In the embodiment shown, the at least a portion of bottom 238b in first compartment 254b comprises valve 120b such that fluid can exit the container if fluid is in first compartment 254b when pitcher 108b is coupled to filtration unit 124 (e.g., when valve 120b is in an open configuration). For example, if first compartment 254b comprises fluid (e.g., unfiltered water), and pitcher 108b is coupled to filtration unit 124 (e.g., such that valve 120b is in an open configuration), fluid is permitted to exit first compartment 254b of pitcher 108b and enter base entry component 206b (e.g., through valve 120b). If pump 194 is activated, pump 194 pumps fluid from base entry component 206b (and also from first compartment 254b of pitcher 108b) through filtration unit 124 (e.g., to be filtered), out of spout 182, and into pitcher 108b. For example, after fluid leaves spout 182, fluid can re-enter pitcher 108b through second opening 216b (defined by base 116b and lid 112b) and into second compartment 258b such that fluid having exited filtration unit 124 (e.g. filtered fluid) is segregated from fluid in first compartment 254b (e.g., unfiltered fluid). In a similar way, if the at least a portion of bottom 238b in second compartment 258b comprises valve 120b, fluid can exit pitcher 108b from second compartment 258b and re-enter pitcher 108b into first compartment 254b such that fluid having exited filtration unit 124 (e.g., filtered fluid) is segregated from fluid in second compartment 258b (e.g., unfiltered fluid).

Each of filtration systems 100a and 100b is configured to be activated to permit pump 194 to begin pumping fluid from pitchers 108a and 108b, respectively. Filtration systems 100a and 100b (and, more specifically, filtration unit 124) can comprise controller 262 coupled to housing 128 and also coupled to pump 194 (e.g., electrically coupled, so that controller 262 can send an activation signal to pump 194). In the embodiment shown, filtration systems 100a and 100b also comprise fluid sensor 266 (e.g., depicted in FIG. 5D) coupled to housing 128 (base entry component 206) and also coupled to controller 262 (e.g., electrically coupled, so that controller 262 can receive a signal from fluid sensor 266). Fluid sensor 266 is configured to detect if fluid enters housing 128 (and, more specifically, base entry component 206). In some embodiments, if fluid sensor 266 detects that fluid has entered housing 128, controller 262 is configured to activate pump 194 to begin pumping fluid through filtration unit 124.

In the embodiment shown (e.g., FIG. 5D), filtration systems 100a and 100b also comprise unit switches 270 and 274 (e.g., magnetic switches) coupled to housing 128 (e.g., base 132 and upper portion 136 of housing 128, respectively) and also coupled to controller 262 (e.g., electrically coupled, so controller 262 can receive a signal from unit switches 270 and 274). Though unit switch 270 is coupled to base 132 of housing 128 in the embodiment shown, unit switch 270 can be coupled to any portion of filtration unit 124 to correspond to a pitcher switch on a pitcher (e.g., pitcher 108b). Similarly, though unit switch 274 is coupled to upper portion 136 of housing 128 in the embodiment shown, unit switch 274 can be coupled to any portion of filtration unit 124 to correspond to a pitcher switch on a pitcher (e.g., pitcher 108a).

In the embodiment shown (e.g., FIG. 4C), pitcher 108b comprises pitcher switch 278b (e.g., a magnetic switch) coupled to bottom 238b of base 116b. Pitcher switch 278b is coupled to bottom 238b of pitcher 108b such that pitcher switch 278b substantially aligns with a unit switch on a filtration unit (e.g., unit switch 270 of filtration unit 124) when the pitcher is coupled to the filtration unit. For example, in the embodiment shown, when pitcher 108b is coupled to filtration unit 124, pitcher switch 278b is configured to align with unit switch 270 such that pitcher switch 278b and unit switch 270 can interface (e.g., magnetically, electrically, mechanically, and the like). In some embodiments, when pitcher switch 278b and unit switch 270 interface (e.g., magnetically, in the embodiment shown), controller 262 is configured to activate pump 194 to begin pumping fluid through filtration unit 124. In some embodiments, controller 262 is configured to activate pump 194 if pitcher switch 278b and unit switch 270 interface and if fluid sensor 266 detects that fluid has entered housing 128.

In the embodiment shown (e.g., FIG. 3E), pitcher 108a comprises pitcher switch 278a (e.g., a magnetic switch) coupled to button 254a of lid 112a via lever 282a. For example, if button 254a is pressed (e.g., to activate dispenser 250a), lever 282a orients pitcher switch 278a (e.g., elevates pitcher switch 278a, in the embodiment shown) such that pitcher switch 278a substantially aligns with a unit switch on a filtration unit (e.g., unit switch 274 of filtration unit 124) when the pitcher is coupled to the filtration unit. For example, in the embodiment shown, when pitcher 108a is coupled to filtration unit 124 and button 254 is pressed, pitcher switch 278a is configured to align with unit switch 274 such that pitcher switch 278a and unit switch 274 can interface (e.g., magnetically, electrically, mechanically, and the like). In some embodiments, when pitcher switch 278a and unit switch 274 interface (e.g., magnetically, in the embodiment shown), controller 262 is configured to activate pump 194 to begin pumping fluid through filtration unit 124. In some embodiments, controller 262 is configured to activate pump 194 if pitcher switch 278a and unit switch 274 interface and if fluid sensor 266 detects that fluid has entered housing 128.

In some embodiments, filtration unit 124 is configured to alert a user when filter 104 should be replaced. For example, filtration unit 124 can be configured to detect an amount of flow through filter 104 (or through some other component of filtration unit 124) to alert a user when filter 104 is scheduled to be replaced. In some embodiments, filtration unit 124 can be configured to alert a user that a filter is scheduled to be replaced based on a volume of flow through filtration unit 124 and/or by an approximate time of usage. For example, in this embodiment, replacement indicator 286 is coupled to base 132 of housing 128 and is also coupled to controller 262. Replacement indicator 286 is configured to alert a user when filter 104 should be replaced (or when filter 104 has a given amount of usage remaining), such as, for example, by changing a color of an LED in replacement indicator 286 or by illuminating an LED in replacement indicator 286. Further, after filter 104 is replaced, a user can press button 290 to indicate to filtration unit 124 that a new filter has been disposed in filtration unit 124 (e.g., resetting any volumetric and/or temporal tracking of the filter).

The structures of the present systems, filtration units, and pitchers, can be made with standard materials (e.g., plastic) using standard manufacturing techniques (e.g., injection molding) and/or can be purchased commercially (e.g., O-rings, nipples, screws, etc.).

This disclosure also includes methods of filtering fluid. In some embodiments, such methods comprise: coupling a pitcher having a valve to a filtration unit such that the valve opens and activating a pump to pump fluid from the pitcher through the valve, the filtration unit, and a filter, and back into the pitcher. In some embodiments, activating the pump comprises pressing a button. In other embodiments, activating the pump comprises coupling the pitcher to the filtration unit.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure, and/or connections may be substituted (e.g., threads may be substituted with press-fittings or welds). Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A filtration system comprising:
   a pitcher comprising:
      a lid including a dispenser; and
      a base configured to be coupled to the lid such that the base and the lid cooperate to define a container configured to hold fluid, where the base has a valve configured to be in:
         an open configuration when the pitcher is coupled to a filtration unit; and.
         a closed configuration when the pitcher is not coupled to a filtration unit; and
   a filtration unit configured to be coupled to the pitcher, the filtration unit comprising:
      a housing configured to cooperate with the pitcher to open the valve;
      a filtration unit lid;
      a filter; and
      a pump configured to be in fluid communication with the filter, and to pump unfiltered fluid from the pitcher through the valve and the filter and into and through the filtration unit lid, into the lid of the pitcher, and through the dispenser.

2. The filtration system of claim 1, wherein the filtration unit lid further includes a spout in fluid communication with the filter and the spout defines an opening through which fluid can exit the filtration unit lid and enter the lid.

3. The filtration system of claim 1, wherein the filtration unit lid further includes a lid tubing, wherein the fluid moves through the filtration unit lid via the lid tubing.

* * * * *